(12) United States Patent
Licht et al.

(10) Patent No.: US 11,401,212 B2
(45) Date of Patent: Aug. 2, 2022

(54) USE OF CARBON NANOMATERIALS PRODUCED WITH LOW CARBON FOOTPRINT TO PRODUCE COMPOSITES WITH LOW CO2 EMISSION

(71) Applicant: C2CNT, LLC, Leesburg, VA (US)

(72) Inventors: Stuart Licht, Leesburg, VA (US); Gad Licht, Leesburg, VA (US)

(73) Assignee: C2CNT, LLC, Leesburg, VA (US)

( * ) Notice: Subject to any disclaimer, the term of this patent is extended or adjusted under 35 U.S.C. 154(b) by 0 days.

(21) Appl. No.: 17/290,199

(22) PCT Filed: Oct. 29, 2019

(86) PCT No.: PCT/US2019/058674
§ 371 (c)(1),
(2) Date: Apr. 29, 2021

(87) PCT Pub. No.: WO2020/092449
PCT Pub. Date: May 7, 2020

(65) Prior Publication Data
US 2021/0387910 A1    Dec. 16, 2021

Related U.S. Application Data

(60) Provisional application No. 62/890,719, filed on Aug. 23, 2019, provisional application No. 62/752,124, filed on Oct. 29, 2018.

(51) Int. Cl.
| | | |
|---|---|---|
| C04B 14/38 | (2006.01) | |
| C25B 1/50 | (2021.01) | |
| C25B 1/135 | (2021.01) | |
| C04B 28/04 | (2006.01) | |
| D01F 9/12 | (2006.01) | |
| C04B 111/00 | (2006.01) | |

(52) U.S. Cl.
CPC ............ C04B 14/386 (2013.01); C04B 28/04 (2013.01); C25B 1/135 (2021.01); C25B 1/50 (2021.01); D01F 9/12 (2013.01); *C04B 2111/00008* (2013.01); *C04B 2111/00017* (2013.01)

(58) Field of Classification Search
CPC .................. C04B 14/386; C04B 28/04; C04B 2111/00008; C04B 2111/00017; C25B 1/50; C25B 1/135; D01F 9/12
See application file for complete search history.

(56) References Cited

U.S. PATENT DOCUMENTS

| | | | |
|---|---|---|---|
| 8,426,501 B1 * | 4/2013 | Taha | ..................... C04B 14/026 524/5 |
| 2009/0229494 A1 | 9/2009 | Shah et al. | |
| 2016/0159692 A1 | 6/2016 | Bickbau | |

FOREIGN PATENT DOCUMENTS

| | | | |
|---|---|---|---|
| CN | 104446264 A | * | 3/2015 |
| JP | 2010006998 A | * | 1/2010 |
| JP | 2010059303 A | * | 3/2010 |
| WO | 2010048457 A1 | | 4/2010 |
| WO | 2018156642 A1 | | 8/2018 |

OTHER PUBLICATIONS

Bambang Suhendro, "Toward green concrete for better sustainable environment" Procedia Engineering, vol. 95 (2014); pp. 305-320 (16 pages).
International Search Report issued in corresponding International Application No. PCT/US2019/058674 dated Jan. 14, 2020 (4 pages).
Kaewunruen et al., "Characteristics of sustainable concrete using crumb rubber integrated with carbon nanotubes" 15th Est-Asia Pacific Conference on Structural Engineering and Construction, University of Birmingham (Nov. 10, 2017) (9 pages).
Kaewunruen et al., "Sustainable and self-sensing concrete" Proceedings of the 12th Annual Concrete Conference, University of Birmingham (Feb. 16, 2017) (11 pages).
Written Opinion of the International Searching Authority issued in corresponding International Application No. PCT/US2019/058674 dated Jan. 14, 2020 (7 pages).
International Preliminary Report on Patentability issued in corresponding International Application No. PCT/US2019/058674 dated Apr. 27, 2021 (8 pages).

\* cited by examiner

*Primary Examiner* — Anthony J Green
(74) *Attorney, Agent, or Firm* — Chamberlain, Hrdlicka, White, Williams & Aughtry

(57) ABSTRACT

A low carbon footprint material is used to decrease the carbon dioxide emission for production of a high carbon footprint substance. A method of forming composite materials comprises providing a first high carbon footprint substance; providing a carbon nanomaterial produced with a carbon-footprint of less than 10 unit weight of carbon dioxide ($CO_2$) emission during production of 1 unit weight of the carbon nanomaterial; and forming a composite comprising the high carbon footprint substance and from 0.001 wt % to 25 wt % of the carbon nanomaterial, wherein the carbon nanomaterial is homogeneously dispersed in the composite to reduce the carbon dioxide emission for producing the composite material relative to the high carbon footprint substance.

12 Claims, 11 Drawing Sheets

USE OF CARBON NANOMATERIALS PRODUCED WITH LOW CARBON FOOTPRINT TO PRODUCE COMPOSITES WITH LOW CO2 EMISSION

CROSS-REFERENCE TO RELATED APPLICATIONS

This application claims the priority and benefits from U.S. Provisional Patent Application Ser. No. 62/752,124, filed Oct. 29, 2018, entitled "Massively amplified carbon cycle GHG $CO_2$ removal with C2CNT carbon nanotube-composites", and U.S. Provisional Patent Application Ser. No. 62/890,719, filed Aug. 23, 2019, "Massively amplified carbon cycle GHG $CO_2$ removal with C2CNT carbon nano-tube-composites", the entire contents of each of which are incorporated herein by reference.

FIELD

The present invention relates to use of carbon nanomaterials produced with low carbon footprint to produce composites with low $CO_2$ emission and related methods.

BACKGROUND

Structural materials, such as cement, metal, or the like, are useful in various applications and industries. For example, cement and metal are useful for the construction of buildings, bridges, and roads; and metals are useful for the production of vehicles and industrial and consumer appliances. A suitable structural material for a particular application may require certain mechanical strength and other physical properties, which can place limitations on the design and cost of a given construction project or product. The pervasive use of structural materials is a substantial contributor to global carbon dioxide emissions and climate change. Additives to structural materials can form composites, alloys or admixtures with improved, desirable properties, laminates, insulators, or drywall can form composites, alloys or admixtures with improved, desirable properties.

It is often desirable to enhance the properties of a structural material through additives to form composites, alloys or admixtures with improved, desirable properties. Examples of desirable properties include tensile, compressive and flexural strength and durability. In a similar manner, additives to other materials such as electrical conductors, glass, ceramics, paper, resin, polymer, or plastics, cardboard laminates, insulators, or drywall can form composites, alloys or admixtures with improved, desirable properties. Examples of desirable properties include electrical conductivity or insulation, thermal conductivity or insulation, small volume or weight, fracture resistance, flexibility and strength.

Additives to form composites with enhanced, desirable properties, can also have drawbacks which include technical complexity, such complexity of forming the composite, lack of desired properties in the additive, or inhomogeneity of the additive, or complexity of scale-up, or scarcity of the additive making the composite cost prohibitive, and increased carbon dioxide emissions in their production contributing to global carbon dioxide emissions and climate change. Furthermore, production of the virgin structural material, or electrical conductors, glass, ceramics, paper, polymer, resin plastics, cardboard laminates, insulators, or drywall is often associated with a large carbon footprint. For example, typical stainless steel production has a carbon footprint of 6.15 tonnes of emitted $CO_2$ per tonne of steel produced. Aluminum production typically emits 11.9 tonnes of $CO_2$ per tonne of product; titanium production typically emits 8.1 tonnes of $CO_2$ per tonne of product; magnesium production typically emits 14 tonnes of $CO_2$ per tonne of product and copper production typically emits 5 tonnes of $CO_2$ per tonne of product. It is often desirable to form a material with a reduced carbon footprint. A reduced carbon footprint emits less greenhouse gas carbon dioxide. Carbon dioxide contributes to climate change, which has adverse effects including global warming, sea level rise, drought, flooding, severe weather events, economic loss, adverse health effects and habitat loss and species extinction.

SUMMARY

The present disclosure relates to methods of combining a high carbon footprint substance, such as structural materials, such as cement, metal, wood or the like, or electrical conductors, glass, ceramics, paper, polymer or plastics, cardboard laminates, insulators, or drywall, to form a composite with a low carbon footprint, readily mixed, industrially scaleable, cost effective carbon nanomaterials to reduce the carbon dioxide emission for producing the composite material relative to the high carbon footprint substance.

In an aspect, there is provided a method of forming lowered carbon footprint materials, comprising providing a first high carbon footprint substance to be converted to a composite with improved property (or properties); providing a material comprising a carbon nanomaterial produced with a carbon-footprint of less than 10 unit weight of carbon dioxide ($CO_2$) emission during production of 1 unit weight of the carbon nanomaterial; and forming a composite comprising the first structural material and from 0.001 wt % to 25 wt % of the carbon nanomaterial, wherein the carbon nanomaterial is homogeneously dispersed in the composite.

In the method of the preceding paragraph, the carbon-footprint may be 1 to 10, or 0 to 1. The carbon-footprint may be negative, which may indicate net consumption of carbon dioxide during the production of the carbon nanomaterial. The carbon nanomaterial may comprise straight carbon nanotubes that do not entangle for ready dispersion in the composite. The carbon nanomaterial may comprise carbon nanofibers. The carbon nanofibers may have an average aspect ratio of 10 to 1000 and a thickness of 3 nm to 999 nm. The nanofibers may comprise carbon nanotubes. The nanofibers may comprise helical carbon nanotubes. The carbon nanofibers may comprise untangled carbon nanofibers. The carbon nanomaterial may comprise carbon nano-onions. The carbon nanomaterial may comprise a carbon nano-scaffold. The carbon nanomaterial may comprise a nano-platelet. The carbon nanomaterial may comprise graphene. The method may comprise adding the reinforcing material to a solid phase, a liquid phase, or a gas phase, of the structural material to form the composite. The method may comprise dispersing the carbon nanomaterial in a liquid to form a first mixture, admixing the first mixture with the structural material to form a second mixture, and forming the composite from the second mixture. The liquid may comprise water. The carbon nanomaterial may be formed from a molten carbonate by electrolysis. The molten carbonate may be generated by reaction of carbon dioxide and a metal oxide in a molten electrolyte. The metal oxide may be a lithium oxide. The molten carbonate may comprise a lithium carbonate, a lithiated carbonate or an alkali and/or alkali earth carbonate mix. The structural material may comprise cement, concrete, mortar, or grout. The structural material may comprise a metal, such as one or more of aluminum, steel, magnesium, and titanium. The structural material may comprise a plastic material. The structural material may comprise a polymer. The structural material may comprise wood. The structural material may comprise a cardboard. The structural material may comprise a laminate. The structural material may comprise a drywall. Other high carbon footprint substances may comprise a resin, a ceramic, a glass, and insulator or an electrical conductor. The carbon nanomaterial may have domain sizes less than 1,000 µm in the composite. The composite may comprise 0.01 wt % to 1 wt %, or 0.01 wt % to 0.5 wt %, or 0.01 wt % to 0.3 wt %, or 0.01 wt % to 0.1 wt %, of the carbon nanomaterial.

In another aspect, there is provided a composite produced according to a method described herein.

In a further aspect, there is provided use of a carbon nanomaterial produced with a carbon-footprint of less than 10 unit weight of carbon dioxide ($CO_2$) emission during production of 1 unit weight of the carbon nanomaterial, for reinforcing a structural material.

In a further aspect, there is provided use of a carbon nanomaterial in a composite comprising a structural material to reinforce the structural material, wherein the carbon nanomaterial is produced with a carbon-footprint of less than 10 unit weight of carbon dioxide ($CO_2$) emission during production of 1 unit weight of the carbon nanomaterial.

In a further aspect, there is provided use of a carbon nanomaterial produced with a low carbon-footprint in a composite comprising a structural material and the carbon nanomaterial, for reducing overall emission of carbon dioxide ($CO_2$) during the manufacture of the composite, wherein the low carbon-footprint is a carbon-footprint of less than 10 unit weight of $CO_2$ emission during production of 1 unit weight of the carbon nanomaterial. The carbon nanomaterial may be produced from a molten carbonate by electrolysis. The composite may be a composite described herein.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

and

Figure 12:
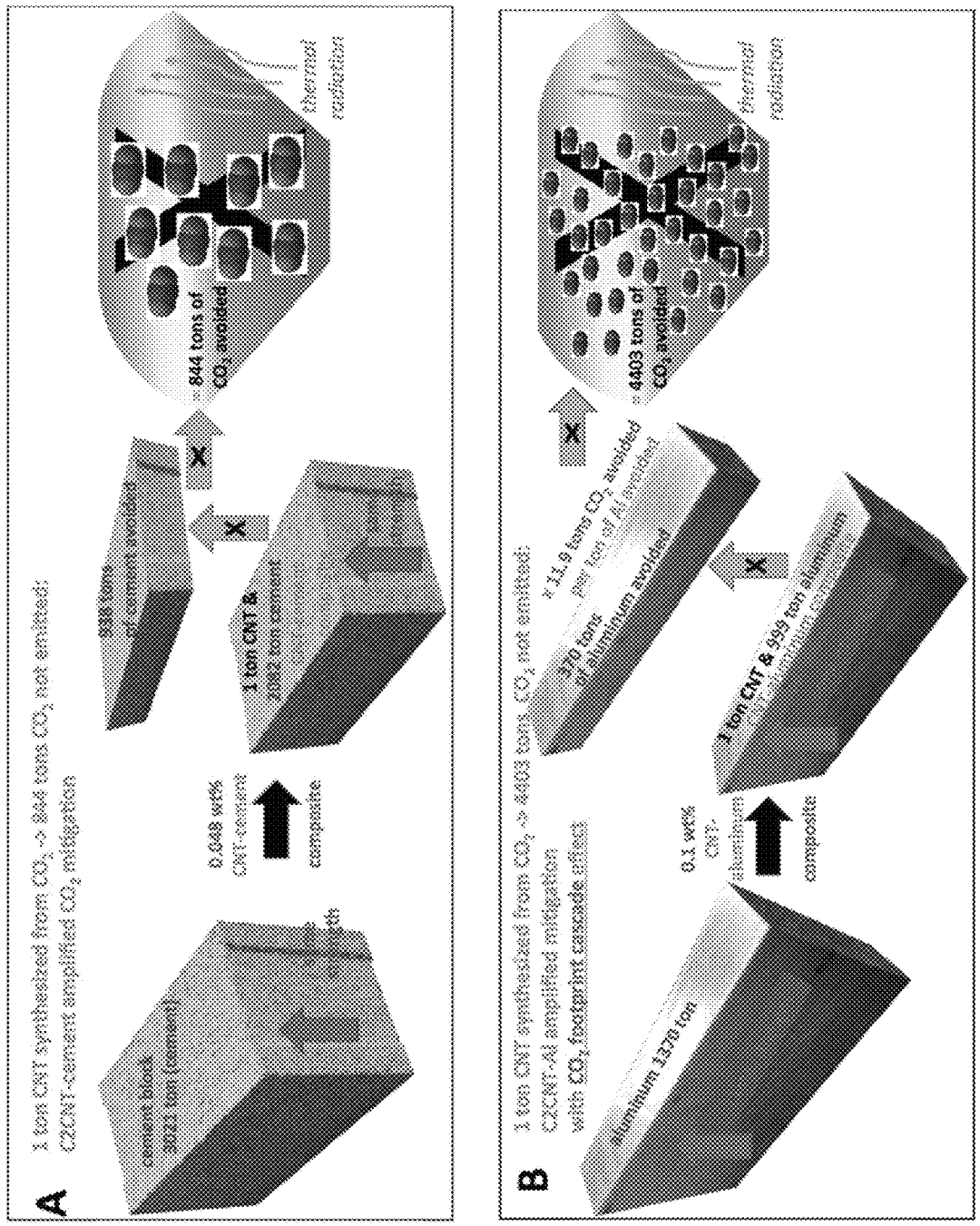

FIG. 12 shows cement and aluminum examples of the $CO_2$ reduction through the addition of carbon nanotubes.

DETAILED DESCRIPTION

It has been recognized that carbon nanomaterials can be used to form composites with enhanced properties. However, conventional carbon nanomaterials are produced with a large carbon footprint, are formed at high cost, and generally form twisted, tangled materials not conducive to the homogeneous dispersion requisite of high quality composites. To date the large (commercial) production of carbon nanomaterials has been accomplished by variants of chemical vapor deposition (CVD) synthesis. For example, a typical conventional technical for producing carbon nanotubes (CNTs) utilizes CVD synthesis. CVD synthesis of CNTs generally produces twisted and tangled CNTs which are not conducive to simple mixing. Entangled and twisted CNTs tend to agglomerate in an aqueous mixture, and are thus difficult to be dispersed homogeneously into the composites based on water mixtures, such as cement or concrete. Uneven distribution of CNTs within the cement or concrete will compromise product integrity and reduce the efficient utilization of the reinforcement material. CVD synthesis utilizes expensive organometallics (or mixtures of metals and organics), at dilute concentration and very high energy. This requires a high expense of preparation and results in a high market cost (for example upwards of $100,000 per tonne for CNTs, and upwards of $1,000,000 per tonne for graphene. Therefore it would not be practical and economical to use carbon nanotubes produced by CVD to produce composites. Furthermore, a CVD process also has a large carbon footprint, for example, emitting up to 600 tonnes of $CO_2$ for producing one tonne of carbon nanomaterials (V. Khanna, B. R. Bakshi, L. J. Lee, J. Ind. Ecology, 12 (2008) 394-410). As used herein, the term "carbon footprint" of a particular product generally refers to the amount of carbon dioxide ($CO_2$) emitted during production of the particular product. The expression "carbon-footprint", denoted $F_c$, is used herein to represent a specific metric of the carbon footprint, $F_c$=the number of unit weight of $CO_2$ emitted during production of one unit weight of the product. $F_c$ can be calculated as the weight ratio of the total $CO_2$ emitted during production and the particular product produced during production, $F_c$=(weight of $CO_2$ emitted during production)/(weight of produced product). Hence CVD has a carbon-footprint of approximately $F_c$=600. A further technical challenge in producing composites of cements and carbon nanofibers such as carbon nanotubes (CNTs) is that CNTs produced by CVD can be highly entangled and tend to agglomerate in an aqueous mixture and are thus difficult to be dispersed homogeneously into the concrete. Uneven distribution of CNTs within the concrete will compromise product integrity and reduce the efficient utilization of the reinforcement material.

A low carbon footprint carbon nanomaterial may be produced from a molten carbonate by electrolysis, at low cost and using $CO_2$ as a reactant, for example as C2CNT ($CO_2$ to Carbon Nanotube) synthesis. However technical challenges had prevented scale-up of the process and the material remains scarce. While, examples of C2CNT CNTs had been termed "straight," each example of synthesized, grouped, CNTs shown was visibly entangled, and twisted or hooked, although less twisted than CNTs denoted "tangled". Entangled and twisted CNTs tend to agglomerate, and are thus difficult to be dispersed homogeneously in a composite. In the C2CNT examples straight referred specifically referred to CNTs containing less $sp^3$ bonding amongst carbons defects and tangled CNTs contain more $sp^3$ defects. Example processes for producing carbon nanomaterials from molten carbonates by electrolysis are disclosed in, for instance, Licht et al., "Transformation of the greenhouse gas $CO_2$ by molten electrolysis into a wide controlled selection of carbon nanotubes," *J. $CO_2$ Utilization*, 2017, vol. 18, pp. 335-344; Ren et al., "One-pot synthesis of carbon nanofibers from $CO_2$," *Nano Lett.*, 2015, vol. 15, pp. 6142-6148; Johnson et al., "Carbon nanotube wools made directly from $CO_2$ by molten electrolysis: Value driven pathways to carbon dioxide greenhouse gas mitigation," *Materials Today Energy*, 2017, pp. 230-236; Johnson et al., "Data on SEM, TEM and Raman Spectra of doped, and wool carbon nanotubes made directly from $CO_2$ by molten electrolysis," Data in Brief, 2017, vol. 14, pp. 592-606; Ren et. al., "Tracking airborne $CO_2$ mitigation and low cost transformation into valuable carbon nanotubes," *Scientific Reports, Nature*, 2016, vol. 6, pp. 1-10; Licht et al., "Carbon nanotubes produced from ambient carbon dioxide for environmentally sustainable lithium-ion and sodium-ion battery anodes," *ACS Cent. Sci.*, 2015, vol. 2, pp. 162-168; Dey et al., "How does amalgamated Ni cathode affect carbon nanotube growth? A density functional theory study," *RSC Adv.*, 2016, vol. 6, pp. 27191-27196; Wu et al., "One-pot synthesis of nanostructured carbon material from carbon dioxide via electrolysis in molten carbonate salts," *Carbon*, 2016, vol. 106, pp. 208-217; Lau et. al., "Thermodynamic assessment of $CO_2$ to carbon nanofiber transformation for carbon sequestration in a combined cycle gas or a coal power plant," *Energy Conyers. Manag.*, 2016, vol. 122, pp. 400-410; Licht, "Co-production of cement and carbon nanotubes with a carbon negative footprint," *J. $CO_2$ Utilization*, 2017, vol. 18, pp. 378-389; Ren et al., "Transformation of the greenhouse gas $CO_2$ by molten electrolysis into a wide controlled selection of carbon nanotubes," *J. $CO_2$ Utilization*, 2017, vol. 18, pp. 335-344; Licht et al., "A new solar carbon capture process: solar thermal electrochemical photo (STEP) carbon capture," *J. Phys. Chem. Lett.*, 2010, vol. 1, pp. 2363-2368; Licht, "STEP (Solar Thermal Electrochemical Photo) Generation of Energetic Molecules: A Solar Chemical Process to End Anthropogenic Global Warming," *J. Phys. Chem. C*, 2009, vol. 113, pp. 16283-16292; Wang et al., "Exploration of alkali cation variation on the synthesis of carbon nanotubes by electrolysis of $CO_2$ in molten electrolytes," *J. $CO_2$ Utilization*, 2019, vol. 34, pp. 303-312; Liu et al., "Carbon nano-onions made directly from $CO_2$ by molten electrolysis for greenhouse gas mitigation," *Adv. Sustainable Syst.*, 2019, vol. 3, 1900056; Licht et al., "Amplified $CO_2$ reduction of greenhouse gas emissions with C2CNT carbon nanotube composites," *Mater. Today Sustainability*, 2019, vol. 6, 100023; U.S. Pat. No. 9,758,881 to Licht, entitled "Process for electrosynthesis of energetic molecules;" U.S. Pat. No. 9,683,297 to Licht, entitled "Apparatus for molten salt electrolysis with solar photovoltaic electricity supply and solar thermal and heating of molten salt electrolysis;" US 2019/0039040 to Licht, entitled "Methods and systems for carbon nanofiber production;" WO2016/138469 to Licht et al., entitled "Methods and systems for carbon nanofiber production;" WO2018/093942 to Licht, entitled "Methods and systems for production of elongated carbon nanofibers;" and WO2018/156642 to Licht, entitled "Methods and systems for production of doped carbon nanomaterials."

In brief overview, an aspect of the present disclosure is related to processes of producing with reduced carbon dioxide emissions a composite wherein the composite high carbon footprint substance formed with a low carbon footprint, readily dispersible a carbon nanomaterial (CNM). Prior to the work described herein, it was thought that CNMs were only mass produced with a high carbon footprint at high cost, and in a tangled matter. Low carbon footprint CNMs could be produced, but were also tangled, could not be dispersed uniformly in a composite, and were not mass produced. Surprisingly, it was found that low carbon footprint CNMs could be produced in an untangled manner, low cost, mass produced, and readily dispersed within a high footprint substance forming a low carbon footprint composite.

Conveniently, carbon nanomaterials produced from a molten carbonate by electrolysis can be produced with a relatively low carbon footprint and a relatively low cost, as compared to carbon nanomaterials produced by other conventional techniques such as chemical vapor deposition (CVD) synthesis, flame synthesis, or plasma synthesis. Here, low cost refers to (i) the cost relative aluminum production, which costs less than $2,000 per tonne, and (ii) to the cost such that the CNM additive cost alone does not comprise more than the cost of the virgin, high carbon footprint substance alone used in the composite. Here, high cost refers to a cost such as over $100,000 or over $1,000,000 per tonne such as is typical of CNMs commercial production by chemical vapor deposition.

However, prior molten carbonate produced CNMs provided technical challenges to scale-up, such as scale-up to industrial dimension electrodes, high current interconnects compatible with high temperature molten carbonates, and management of the CO2 gas reactant in industrial conditions. Furthermore, all prior molten syntheses produced CNMs that were tangled, twisted or overlapping. Such tangling, twisting or overlapping is a technical barrier to the facile separation and uniform, homogeneous dispersion of CNMs requisite for a homogeneous composite.

Figures 1A, 1B, 1C:
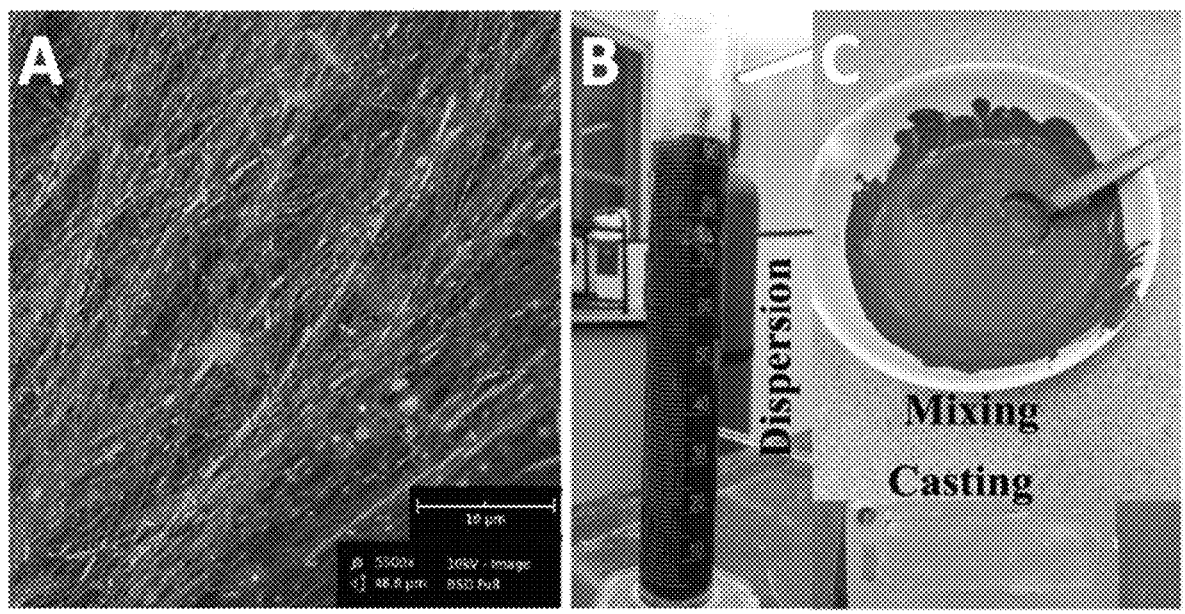
FIG. 1A is a scanning electron microscope (SEM) image of sample carbon nanotubes produced from a molten carbonate by electrolysis.
FIG. 1B is photographic image of a glass container containing a mixture of water and carbon nanotubes homogeneously dispersed in water.
FIG. 1C is a photographic image of a composite material formed from the mixture of FIG. 1B.

As shown in FIG. 1A, new conditions of the molten carbonate electrolysis produces CNMs that do not tangle, twist or overlap. The production of CNMs by molten carbonate electrolysis permits substantial control over the CNM product by control of electrolysis conditions such as electrode material choice, electrolyte compositions, and temperature. As shown in FIG. 1A, new conditions of a 740° C. electrolyte composed (by wt %) of 73% $Li_2CO_3$, 17% $Na_2CO_3$, and 10% $LiBO_2$, using a Muntz Brass cathode and an Inconel anode produce uniform, straight carbon nanotubes. The scanning electron microscope (SEM) image of the CNT product is shown. The CNT product is produce at high coulombic efficiency of 97.5% (97.5% of the applied charge results in CNT mass in accord with the 4 electron reduction of $CO_2$).

The untangled CNTs of FIG. 1A were hydrophobic, but were readily, uniformly dispersed in water facilitated by a short duration of sonication. Upon mixing the aqueous suspension of homogeneously dispersed CNTs with Portland cement, the resulting admixture was readily cast into CNT-cement composites, 0.048 wt %, of the produced CNTs was added to Portland cement to form the CNT-cement composite. It was observed that less than 0.75 unit weight of the composite could provide the same mechanical strength as 1 unit weight of the pure cement, a reduction in mass by at least 25%. The mass reduction of the high footprint substance, cement, formed by composite with same strength low foot print CNM, requires less cement to produce, reducing the carbon dioxide emission for producing the composite material relative to the high carbon footprint substance.

In a preferred embodiment, a high carbon footprint substance is combined with a low carbon footprint carbon nanomaterial forming a composite with reduced carbon dioxide emission relative to the high carbon footprint substance. In a preferred embodiment that low carbon footprint carbon nanomaterial is industrially scaleable, and produces untangle carbon nanomaterials. In a further preferred embodiment that high carbon footprint substance is a structural material, such as cement, metal, wood or the like. In a further preferred embodiment that high carbon footprint substance is electrical conductors, glass, ceramics, paper, polymer or plastics, cardboard laminates, insulators, or drywall.

A "low carbon footprint" herein refers to a carbon footprint with $F_c \leq 10$. Processes or products produced with no $CO_2$ emission or with a net consumption of $CO_2$ are also considered to have a low carbon footprint, where $F_c \leq 0$.

Producing CNM from molten carbonate by electrolysis consumes $CO_2$ as the reactant, and thus has a negative carbon footprint.

It has been recognized by the present inventors that the above-noted drawbacks of high costs, negative environmental impact, and technical difficulties likely all contributed to the limited utilization of carbon nanomaterials produced by CVD and other similar conventional techniques in commercial and industrial applications.

When carbon nanomaterials are added to a structural material such as concrete or a metal structure, the resulting composite material can have improved mechanical properties such as improved tensile, compressive and flexural strength. For example, it has been demonstrated that carbon nanotubes (CNTs) have a tensile strength of up to about 93,900 MPa and adding a small amount, such as less than 0.05 wt %, less than 0.8 wt %, or less than 1 wt %, of CNTs to cement can produce carbon nanotube-cement (CNT-cement) composites with much improved mechanical properties. For example, tensile, compressive, and flexural strengths of the composite may be higher than those of the virgin cement, such as by 45% in a typical case.

Figure 2:
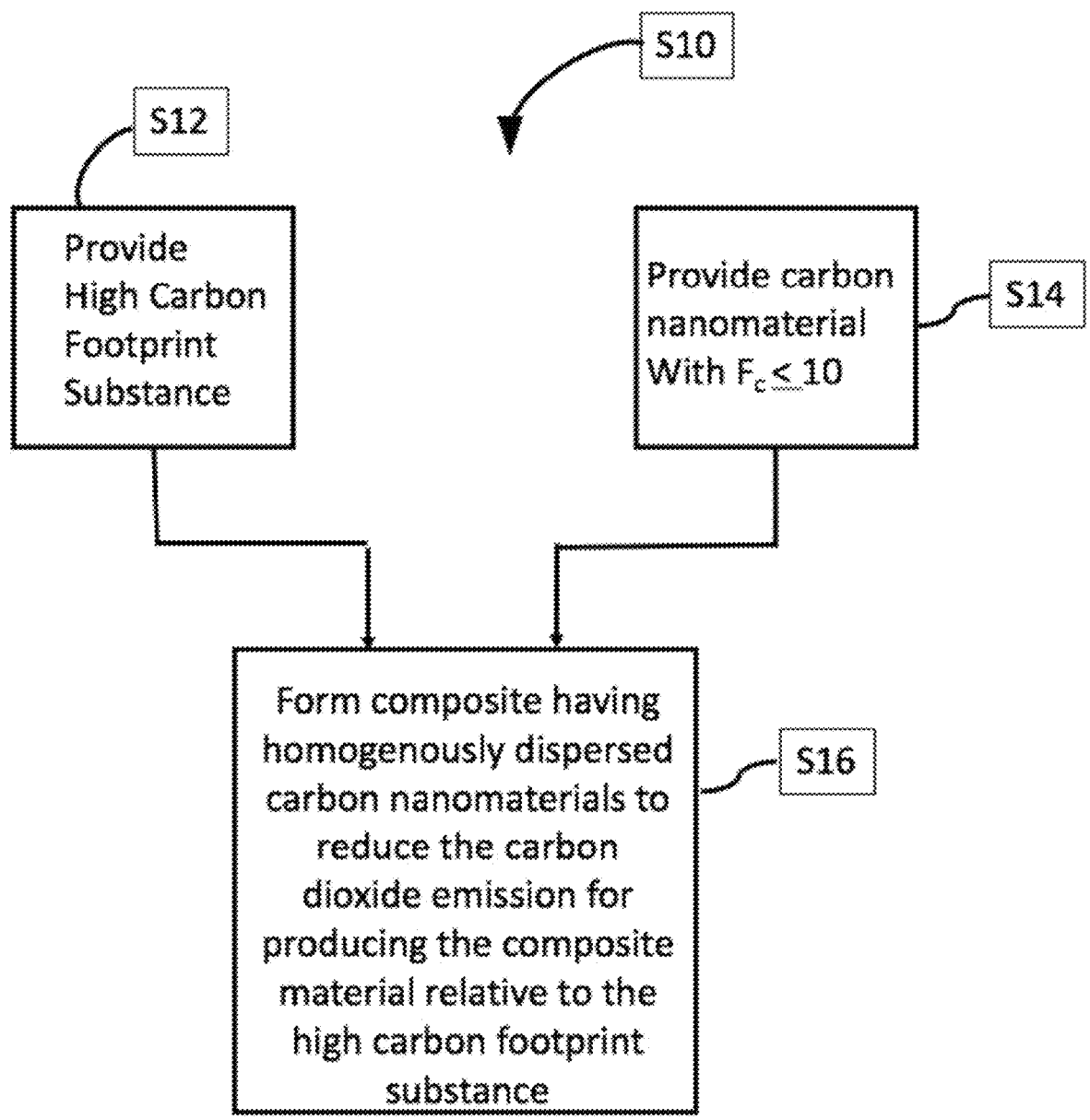
FIG. 2 is a schematic block diagram illustrating an example production process for producing a composite of a structural material and a carbon nanomaterial, according to an embodiment of the present disclosure.

FIG. 2 illustrates an example process S10 according to an embodiment of the present disclosure.

As illustrated, a high carbon footprint substance is provided at S12. The substance, as an example, may be a structural material that is used primarily to provide a physical structure or support a physical structural in view of the material's mechanical properties, as opposed to its other properties such as electrical, magnetic, electromagnetic, or chemical properties. Common structural materials include concrete, cement, mortar, grout, metals such as steel, aluminum, iron, magnesium, titanium, or alloys, wood, paper board or cardboard, plastic materials, composites, or the like. It is noted that in some applications, a structural material may be selected in view of its other properties in addition to its mechanical properties.

The structural material provided at S12 may be obtained, produced or prepared by any technique, including conventional techniques known to those skilled in the art.

For example, cement may be produced using a dry or wet process. In some embodiments, cement may be produced through controlled chemical combination of calcium, silicon, aluminum, iron and other ingredients known to those skilled in the art. The ingredients used to manufacture cement may include limestone, shells, and chalk or marl combined with shale, clay, slate, blast furnace slag, silica sand, and iron ore. These ingredients may be heated at high temperatures to form a rock-like substance, which is then ground into fine powder to form cement. Concrete includes the addition of aggregates including sand, fly ash or ground rock.

In a typical cement and/or concrete manufacturing process, finely ground raw materials, or a slurry of the raw materials mixed with water, may be fed into the kiln at the top of the kiln. The lower end of the kiln is provided with a flame, which may be produced by precisely controlled burning of powdered coal, oil, or other fuels or gases under forced draft. As the materials move through the kiln, certain elements are driven off in the form of gases, and the remaining elements unite to form a clinker, which is extracted or discharged from the kiln and cooled. The cooled clinker may ground and mixed with small amounts of gypsum and limestone. In a dry process, the raw materials are ground without being mixed with water. In a wet process, the raw materials are ground with water before being fed into the kiln. Heated limestone releases carbon dioxide, Calcination of limestone, processing and fuel combustion emit the greenhouse gas carbon dioxide in the manufacturing of cement and concrete.

Metallic or alloy structural materials may also be produced according to known technics. As with cement or concrete, while metallic or alloy structural materials are widely evident through their pervasive use as in building, transportation, and commodity support and packaging, their product carbon footprint substance ion has a high carbon footprint contributing to global warming and climate change.

A carbon nanomaterial is provided at S14. The carbon nanomaterial is not produced with conventional techniques such as CVD, arc discharge or laser ablation that have high carbon footprints, but is produced by a process with a low carbon footprint of $F_c \leq 10$, such as $F_c \leq 5$, $F_c \leq 3$, $F_c \leq 1$, or $F_c \leq 0$. In some embodiments, $F_c < 0$, where the carbon nanomaterial is produced with net $CO_2$ consumption. In some embodiments, $F_c$ is 0 to 1.

S16 combines the high carbon footprint substance S12 and low carbon foot print carbon nanomaterial S14 to produce a stronger composite requiring less of the original high carbon footprint substance.

Figure 3:
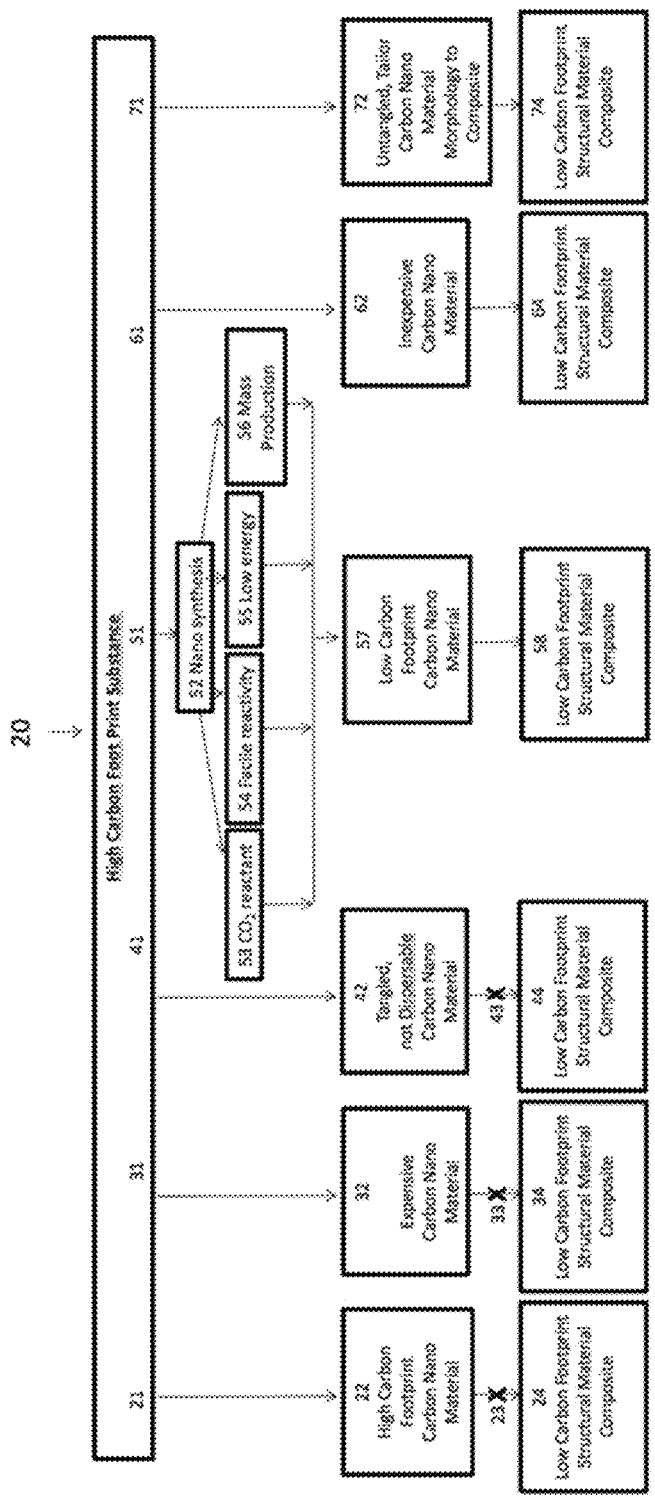
FIG. 3 is a block diagram illustrating the challenges of structural material-carbon nanomaterial composite pathways to lower carbon footprint structural materials, and the removal of hurdles to greener structural materials.

For comparison purposes, FIG. 3 illustrates possible processes 20 with different possible pathways 21, 31, 41, 51, 61, and 71 to form composites, and the challenges of existing material-carbon nanomaterial composite pathways 21, 31, 41 to lower carbon footprint materials, and the removal of hurdles to greener carbon footprint substance that may be produced according to an embodiment of the present disclosure, such as through pathways 51, 61 and 71.

In particular, at possible pathway 21, the high carbon footprint substance may be combined with a low carbon footprint carbon nanomaterial at 22. The pathway 21, however, inhibits, as indicated by the cross (X) at 23, formation of a lower carbon footprint composite 24, due to the high carbon footprints of both the higher carbon footprint substance and the carbon nanomaterial. Thus, a person skilled in the art would not have been motivated to take the pathway 21 to produce low carbon footprint composite materials 24.

At possible pathway 31, the carbon footprint substance may be combined with an expensive carbon nanomaterial at 32. However, the high cost dis-incentivizes the skilled person to take pathway 31, and a skilled person in the art would not have been motivated to take pathway 31, as indicted by the cross (X) at 33, to produce a lower carbon footprint composite material 34.

As illustrated at possible pathway 41, carbon nanomaterials produced by a conventional technique at 42 that tend to tangle and cannot be homogeneously dispersed in the high carbon footprint substance are not suitable for producing a lower carbon footprint high carbon footprint substance 44, as indicated by the cross (X) at 43. It should be understood that uniform carbon nanomaterial dispersion can provide improved properties of CNM-composites. However, CNMs produced in high volumes by existing conventional techniques are generally agglomerated or tangled, thus rendering them unsuitable for dispersion.

In comparison, in some embodiments of the present disclosure, one or more of pathways 51, 61, 71 can be taken to reduce the production carbon footprints.

According to some embodiments disclosed herein, an inexpensive and low carbon footprint composite material may be produced by taking the pathway 51. According to pathway 51, at 57 the carbon footprint substance can be combined with a low carbon footprint carbon nanomaterial produced at 52, to provide a stronger composite material at 57 that decreases the amount of the high carbon footprint substance used to achieve the same strength. Reducing the amount of the high carbon footprint substance used would decrease the carbon dioxide emissions of the high carbon footprint substance production to lower the carbon footprint of the composite material 57 relative to the original high carbon footprint substance. Different factors or processing steps in the production of the carbon nanomaterial at 52 can contribute to the reduction in the production carbon footprint. For example, as indicated at 53, a lower carbon footprint in the production of the carbon nanomaterial can be achieved producing the carbon nanomaterial using $CO_2$ as the reactant. As indicated at 54, a more facile reactivity may contribute to the reduction in the production carbon footprint. As indicated at 55, a processing step that requires a lower energy and/or less carbon dioxide emitting energy may contribute to the reduction in the production carbon footprint.

In pathway 61, the high carbon footprint substance is combined with a low cost carbon nanomaterial that is produced at 62 with a low production cost, to form a composite 64 with a low carbon footprint. The pathway 61 can provide a less expensive composite material 64 with increased strength, which also decreases the amount of high carbon footprint substance used to achieve the same strength and lowers the carbon footprint of the composite material relative to the original high carbon footprint substance.

In pathway 71, the high carbon footprint substance is combined with a carbon nanomaterial produced at 72 and tailored for a specific CNM-composite property enhancement to form a composite 74. Examples of tailored CNM may include boron doped CNM to improve CNM-composite electrical conductivity as well as strength, thick walled CNTs to improve CNT-composite compressive strength, or long CNTs to improve CNT-composite flexural strength. The tailored CNMs combined with the high carbon footprint substance may be combined to form the desired lower carbon footprint composite material at 74.

The carbon nanomaterial may be provided in the form of carbon nanofibers such as closed fibers or carbon nanotubes (CNT) of solid filled, solid nano filaments. The carbon nanotubes (CNT) may be single-walled CNT (SWCNT) or multi-walled CNT (MWCNT). The carbon nanofibers may conveniently be untangled, i.e. having no entanglement or a low degree of entanglement, for reasons to be discussed below.

In some embodiments the carbon nanomaterial, may be carbon nanofibers with an average aspect ratio of 10 to 1000. The carbon nanofibers may have a thickness of 3 nm to 999 nm.

In some embodiments, the carbon nanomaterial may include carbon nano-onions, carbon nano-scaffold, carbon nano-platelet, or graphene.

In some embodiments, the carbon nanomaterial provided at S14 may include a combination of different forms, including those described above.

Figure 4:
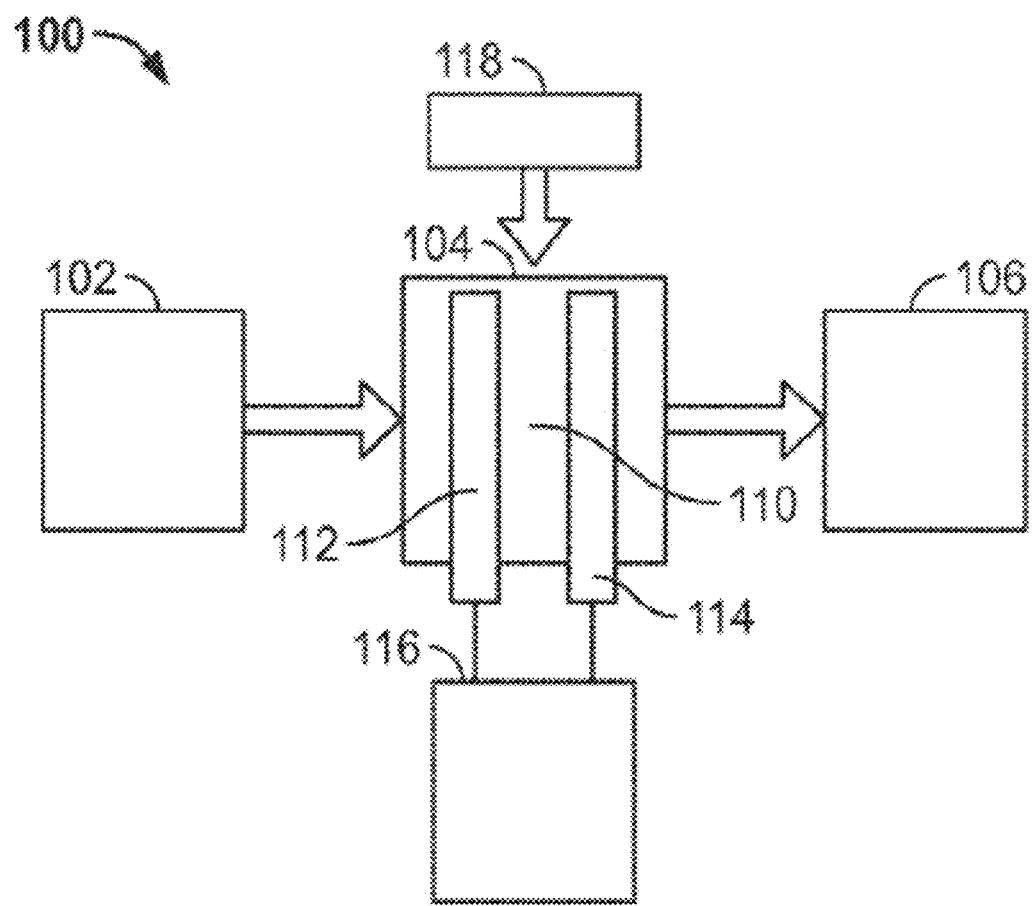
FIG. 4 is a block diagram of an electrolysis system to produce carbon nanomaterials from molten carbonate and carbon dioxide.

FIG. 4 illustrates an example system 100 for producing carbon nanotubes from molten carbonate by electrolysis. See also similar systems described in more details in WO 2017/066295 and WO 2016/138469.

The molten carbonate may be a lithium carbonate or lithiated carbonate. Molten carbonates, such as a lithium carbonate $Li_2CO_3$, which has a melting point of 723° C., or lower melting point carbonates such as $LiBaCaCO_3$, having a melting point of 620° C., when mixed with highly soluble oxides, such $Li_2O$ and BaO, sustain rapid absorption of $CO_2$ from the atmospheric exhaust $CO_2$. Suitable carbonates may include alkali and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof.

Carbonate's higher concentration of active, reducible tetravalent carbon sites adjacent to the active reduction site at the cathode decreases the energetics and facilitates charge transfer resulting in high rates of carbonate reduction at low electrolysis potentials. $CO_2$ can be bubbled into the molten carbonate replenishing carbonate transformed to carbon, and during electrolysis, oxygen is evolved at the anode while a thick solid carbon builds at the cathode. The resulting solid carbon may be carbon nanomaterials such as carbon nanofibers or carbon nanotubes.

A transition metal nucleating agent may be added during electrolysis of the molten carbonate. The transition metal creates nucleation sites that allow the growth of the carbon nanomaterials. Example transition metal nucleating agents include nickel, iron, cobalt, copper, titanium, chromium, manganese, zirconium, molybdenum, silver, cadmium, vanadium, tin, ruthenium, or a mixture therein.

System 100 produces carbon nanomaterials from molten carbonate materials and injected $CO_2$. System 100 includes a carbonate furnace 102, an electrolysis chamber 104, and a collector 106. Although the furnace 102, the electrolysis chamber 104, and collector 106 are shown as separate components in FIG. 2, they can be provided and integrated in the same physical structure. The electrolysis chamber 104 includes a chamber 110 that holds molten carbonate produced by heating carbonate in the furnace 102. An anode 112 and a cathode 114 are coupled to a power source 116. The anode 112 and the cathode 114 are inserted in the chamber 110. $CO_2$ is injected into the molten carbonate from a $CO_2$ source 118. $CO_2$ gas is injected into the molten carbonate to react with the oxide and renew, rather than consume, the carbonate, for the overall electrolysis reaction as $CO_2$ converted to $O_2$ at the anode 112 and carbon nanomaterials at the cathode 114.

Any $CO_2$ source may be used as $CO_2$ source 118. For example, environment air may provide a $CO_2$ source. Emission gases from various plants or chemical reactors may provide $CO_2$ sources. For example, power generating plants, steam generation facilities, or pyrolysis reactors may emit $CO_2$. $CO_2$ emitted from system 100 or in the production of the high carbon footprint substance may also be used as a $CO_2$ source.

In some embodiments, during operation, the carbonate furnace 102 heats a carbonate, such as pure $Li_2CO_3$, to its melting point to produce molten carbonate. A transition metal is added via a disperser that may be the anode to serve as a nucleation agent. The molten carbonate is subjected to electrolysis by being inserted between the anode 112 and the cathode 114 in the electrolysis chamber 104. The resulting reaction separates carbon from the carbonate and leaves carbon product on the cathode 114 from the nucleation sites. The resulting carbon product is collected in the collector 106 while oxygen is produced on the anode 112.

In some embodiments, the molten carbonate may be a lithium carbonate, $Li_2CO_3$, and the metal oxide may be a lithium oxide, $Li_2O$. The carbon nanomaterial, such as carbon nanotubes, may be produced in an reaction represented by:

$$Li_2CO_3 \rightarrow C_{CNM} + O_2 + Li_2O \quad (1)$$

Atmospheric $CO_2$ rapidly and exothermically dissolves in the electrolyte, chemically reacting with lithium oxide to renew and reform $Li_2CO_3$, $$CO_2 + Li_2O \rightarrow Li_2CO_3 \quad (2)$$

Electrolysis, via equation (1), releases $Li_2O$ to permit continued absorption of $CO_2$, via equation (2). Taking the net reactions of equations (1) and (2), $CO_2$ is split by electrolysis to form carbon nanomaterials and oxygen, under the net reaction:

$$CO_2 \rightarrow C_{CNM} + O_2 \quad (3)$$

As indicated by equation (3), $CO_2$ is split and oxygen is released while solid carbon is formed at the cathode 114.

In other embodiments, different carbonates, or carbonate mixes, may be used to replace the lithium carbonate. In such cases, equations (1) and (2) may be correspondingly modified but equation (3) can remain the same, as can be understood by those skilled in the art.

Transition metals, such as Ni or Cr, may be added to nucleate CNM formation. The added transition metal may be less than 0.1 wt % of the product. The transition metal or nucleate agent can be added to the electrolyte or to the cathode 114, or may be added by leaching from the anode 112.

The furnace and electrolysis chamber in the system 100 may be powered by any power source or a combination power sources, including electrical power sources and solar power sources. Heating is provided by the exothermic reaction of carbon dioxide absorption and conversion to carbonate.

The produced carbon nanomaterials may have nanofiber such as nanotube structures. For example, carbon nanofibers may be produced at the cathode 114 when the anode 112 is a nickel anode and electrolysis is conducted in a corrosion-free lower temperature of 630° C. with a $Li_{1-6} Ba_{0.3} Ca_{0.1} CO_3$ electrolyte.

The produced carbon nanomaterials may also have amorphous and platelet structures. For example, when the anode 112 is a platinum anode (and does not contain nickel or nickel coating) and a $Li_3CO_2$ carbonate is heated to a temperature of about 730° C., carbon platelets may be formed, which have partially formed multi-layered graphene/graphite and may contain greater than 99 wt % carbon.

As described in the above cited literature, the type and characteristics of the carbon nanomaterial produced using system 100 can depend on, and thus be controlled by adjusting, the electrical current level, the composition of the electrolyte, the reaction temperature, the viscosity of the electrolyte, the amount of transition material present, and the cathode and anode materials.

For example, the anode 112 may include platinum, iridium, and nickel. In lithium carbonate electrolytes, nickel corrosion at the anode 112 is slow and is a function of anode current density, electrolysis time, temperature, viscosity, and lithium oxide concentration.

Conveniently, producing carbon nanofibers from molten carbonates and $CO_2$ by electrolysis can form homogenous carbon nanofibers, which can be conveniently dispersed homogenously into the structural material as will be further described. In particular, it has been shown in the literature that the nickel presence at anode 112 may be controlled so that the nickel can act as a nucleating agent to facilitate formation of homogenous carbon nanofibers.

It has also been shown that carbon nanofibers produced by electrolysis in pure molten $Li_2CO_3$, without adding $Li_2O$, can be consistently untangled, uniform, and long. The resulting carbon nanofibers can be uniform nanotubes having a width of 0.3 to 1 μm and a length of 20 to 200 μm, with an aspect ratio of about 20 to about 600.

Additives may be added to the molten electrolyte to control the properties of the produced carbon nanomaterials. Some additives, such as nickel, can act not only as nucleating sites, but also as filling agents in the formed hollow nanotubes. Additives other than oxides or transition metal salts can also act as carbon nanomaterial filling or coating agents, or be used to affect the viscosity of the electrolytes. For example, both inorganic aluminate and silicate salts are highly soluble in molten lithium carbonate. High concentrations of either inorganic aluminate or silicate salts can increase the viscosity of the electrolyte.

As previously described, a high applied electrolysis voltage, generally in excess of ~3V during the electrolysis, can yield lithium metal, aluminum metal or silicon with, on or in the carbon nanomaterials.

Different types of nanomaterials may be generated by controlling the electrolysis process, conditions, and the materials present in the electrolyte and at the anodes. For example, as described in the literature, straight and untangled carbon nanotubes can be produced from molten carbonate electrolyte if no $Li_2O$ is added during electrolysis. In contrast, tangled carbon nanotubes may be formed if $Li_2O$ is added to the molten carbonate electrolyte during production. The diffusion conditions during electrolytic splitting of $CO_2$ in molten lithium carbonate can be adjusted to control whether the formed carbon nanofibers are solid fibers (filled nanofibers) or hollow carbon nanotubes. The oxide and transition metal concentrations can be adjusted to further control the formation of tangled or straight (untangled) fibers. For the purpose of convenient homogeneous dispersion of the carbon nanomaterials in the structural material, homogeneous untangled nanofibers with more uniform sizes are more desirable, and can be produced using system 100.

The power source for system 100 may be an electric source such as a source of electrical power generated by a coal, natural gas, solar, wind, hydrothermal, or nuclear power plant. As an alternative to conventionally generated electrical sources, the carbon nanomaterial may be produced using electric current generated by a solar cell.

Alternative $CO_2$ sources may be used, which may include oxides of a $^{12}C$, $^{13}C$ or $^{14}C$ isotope of the carbon, or mixture thereof. For example, $^{12}CO_2$ may be suitable for forming hollow carbon nanotubes under certain conditions. Under similar conditions, adding heavier $^{13}CO_2$ to the molten carbonate can facilitate formation of solid core carbon nanofibers.

Atmospheric $CO_2$ has been used to form multi-walled carbon nanotube according to a process described herein.

By controlling the electrolysis conditions, the produced product may alternatively include amorphous graphites or graphenes.

In some embodiments, the system 100 in FIG. 2 may be used to transform $CO_2$ gas dissolved in the molten carbonate electrolyte by electrolysis at a nickel anode and at a galvanized steel cathode. At the anode 112 the product is $O_2$ and at the cathode 114 the product contains uniform carbon nanofibers, which may be carbon nanotubes. Carbon nanotubes may be favored if the electrolysis is performed at lower current densities of the molten carbonate without added $Li_2O$ electrolytes.

Amorphous carbon may be produced at a steel cathode without the use of a transition metal anode. Use of a zinc coated (galvanized) steel cathode and a non-transition metal anode in electrolysis can produce spherical carbon nanomaterials. Use of a zinc coated (galvanized) steel cathode and a non-transition metal anode in electrolysis but with high iron content from iron oxide dissolved in the electrolyte can produce amorphous carbon as well as a wide variety of carbon nanostructures on the cathode.

Zinc metal on the cathode can lower the energy to form carbon and help initiate the carbon nanotube or carbon nanofiber formation process. The presence of the zinc metal can act as a beneficial aid as it is energetically sufficient to activate both (i) the spontaneous formation of solid carbon from carbonate and (ii) the spontaneous formation of metal catalyst nuclei that aid initiation of the controlled structure growth of carbon nanomaterials at the nucleation site. Zinc thereby facilitates subsequent high yield carbon nanomaterial growth from $CO_2$ dissolved in molten carbonate.

The cathode 114 and the anode 112 may have any number of shapes. For example, the anode 112 and cathode 114 may be a coiled wire, a screen, a porous material, a conductive plate, or a flat or folded shim. They can also form inner sides of the electrolysis chamber 104.

It is also noted that in some embodiments, when a relatively high current density is applied in electrolysis, amorphous carbon and a variety of carbon nanostructures are more likely produced. When an initial low current density and then a high current density is applied in combination with $Li_2O$ in the molten carbonate electrolyte, high yield uniform but twisted carbon nanofibers are likely produced at the cathode 114. When an initial low current density and then a high current density is applied in combination a molten carbonate electrolyte without $Li_2O$, high yield uniform straight carbon nanofibers or carbon nanotubes are produced at the cathode 114.

In brief recap, during $CO_2$ electrolysis for producing carbon nanomaterials, the transition metal deposition can control nucleation and morphology of the carbon nanostructure. Diffusion can control the formation of either carbon nanotubes as grown from natural abundance $CO_2$ or carbon nanofibers from $^{13}C$ isotope morphologies. The electrolytic oxide controls the formation of tangled nanotubes from a high $Li_2O$ molten carbonate electrolyte or straight nanotubes when the molten carbonate electrolyte has no added $Li_2O$.

A transition metal such as nickel may be added on the anode 112, which can be dissolved from the anode 112 to migrate through the electrolyte onto the cathode 114. The added transition metal can function as a nucleating agent, which may be selected from nickel, iron, cobalt, copper, titanium, chromium, manganese, zirconium, molybdenum, silver, cadmium, tin, ruthenium, or a mixture thereof. The transition metal may also be introduced as a dissolved transition metal salt to the electrolyte directly to migrate onto the cathode 114. It is also possible to add the transition metal nucleating agent directly onto the cathode 114.

Figure 5:
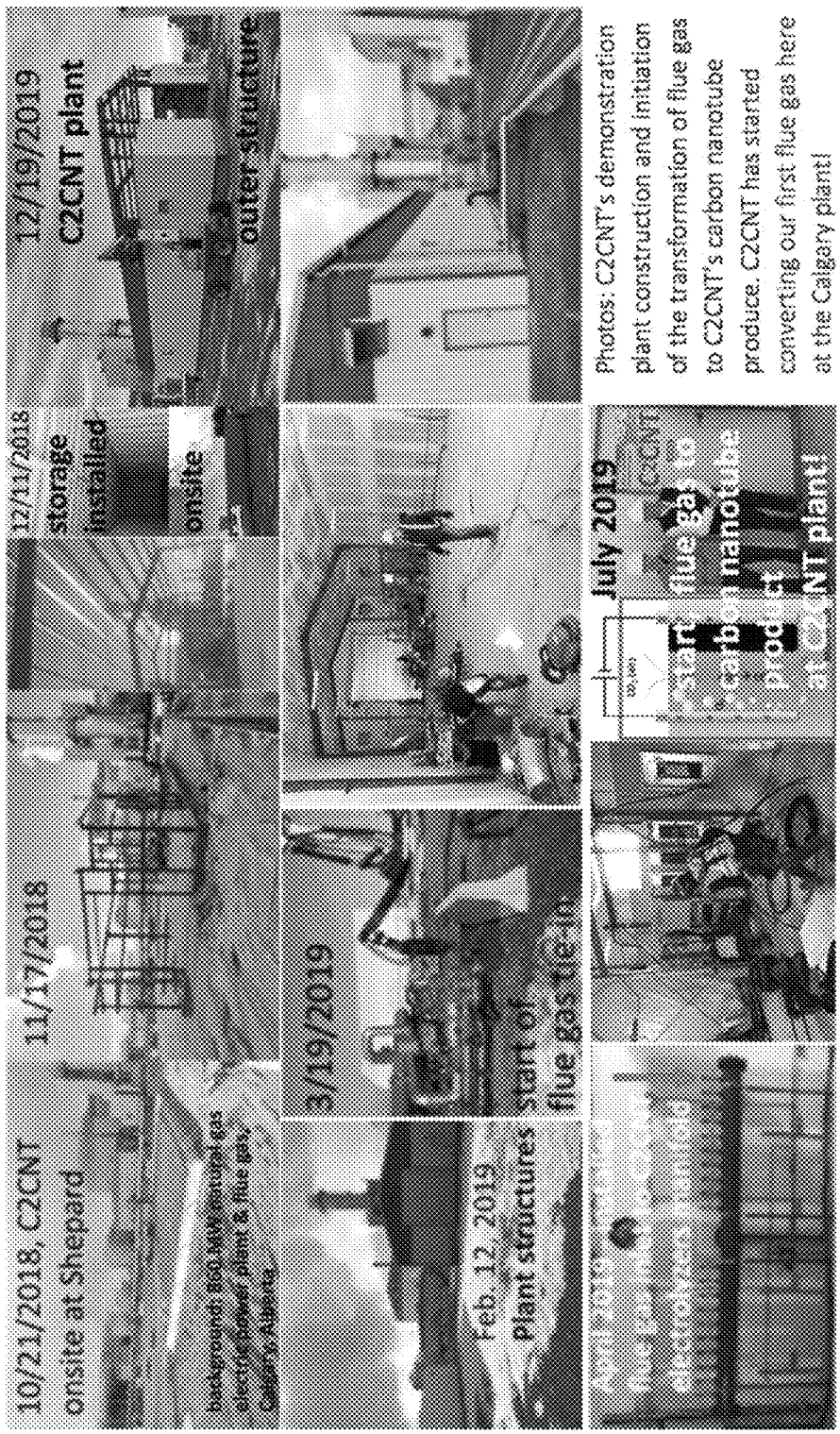
FIG. 5 comprises photographs of building the 2 tonne CO2 daily conversion C2CNT plant.

Low carbon footprint CNTs were previously scarce with technical challenges to scale-up, and the possibility mass production was unproven. Prior molten carbonate produced CNMs provided technical challenges to scale-up, such as scale-up to industrial dimension electrodes, high current interconnects compatible with high temperature molten carbonates, and management of the $CO_2$ gas reactant in industrial conditions. FIG. 5 comprises photographs of building the 2 tonne $CO_2$ daily conversion industrial C2CNT plant. The technical challenges of gas management plant is overcome with heat exchange between the incident flue gas as the $CO_2$ source and the exhaust gas freed of $CO_2$. The industrial dimension electrodes and high temperature interconnects are operational. The system converts flue gas from the adjacent 860 MW Shepard Energy Centre, Calgary, Calif. natural gas power plant.

Due to the expense, energy intensity and complexity of the synthesis industrial CNTs, generally produced by variants of the chemical vapor deposition process, currently cost to produce in the range of $100K ($85-$450K) per ton range and do not use $CO_2$ as a reactant. This high cost de-incentivizes their use as an additive to reduce the $CO_2$ emissions of structural materials and leads prior art way from any conceptualization of the current invention. All components of the molten carbonate electrolytic transformation of $CO_2$ to graphene are inexpensive. The transformation bears many similarities to the production of aluminum, and may be compared to the established costs of this latter, mature industry. In the $19^{th}$ century aluminum was more expensive than gold with little market. However, via a change of chemical technology today aluminum is inexpensive with a mass market. Both processes entail the straightforward, high current density, molten electrolytic electrochemical reduction of an oxide, and do not use noble or exotic materials. $CO_2$ electrolysis in molten carbonate production of carbon nanomaterials readily scales upward linearly with the area of the electrolysis electrodes, facilitating the analogous larger scale synthesis of graphene. The aluminum electrolysis uses and consumes a carbon anode that emits carbon dioxide, whereas the molten carbonate carbon nanomaterial electrolysis anode is not consumed and emits oxygen. 52% of the $1,880 per tonne cost of Al production consists of bauxite and carbon; whereas this molten carbonate electrolysis does not consume carbon as a reactant and uses a no-cost oxide as the reactant to be reduced ($CO_2$, rather than mined bauxite). Molten carbonate $CO_2$ electrolysis costs, such as kilns, electrodes and electrolyte, are similar, but less expensive than the industrial production of aluminum.

In addition to a higher carbon footprint, the aluminum process necessitates a larger physical footprint. Aluminum production uses the higher density of liquid aluminum compared to the density of the fluoride electrolyte to collect the aluminum product from a horizontal electrode; whereas the nanocarbon product resides on the cathode, which therefore may be stacked vertically in a low physical footprint configuration. The carbon nanomaterial molten carbonate electrolysis, process operates under somewhat milder conditions at ~700 to 800° C. in a less exotic, molten carbonate electrolyte at similar rates of output, but at 0.8 V to <2 V potential compared to an electrolysis potential of over 4 V for aluminum.

Hence, $1,000 is a reasonable upper bound estimation to industrial carbon graphene production by carbon dioxide electrolysis, excluding anode and exfoliation costs to be determined, in molten carbonates. This cost is significantly lower than the current price of graphene, and may provide a significant incentive to use the greenhouse gas carbon dioxide as a reactant to produce carbon graphene. This can provide a useful path forward to help break the anthropogenic carbon cycle to mitigate climate change.

Different $CO_2$ sources may be used for the above described process of production of carbon nanomaterials. For example, the $CO_2$ source may be air or pressurized $CO_2$. The $CO_2$ source may be concentrated $CO_2$, such as that found in a smokestack or flue, including chimneys, and industrial stacks such as in the iron and steel, aluminum, cement, ammonia consumer and building material, and transportation industries.

Another source of $CO_2$ may be from hot $CO_2$ generated during fuel combustion in a fossil fuel electric power plant. In such a system, electricity and carbon nanomaterials may be produced without $CO_2$ emission. A portion of the fossil fuel electric power plant outputs power for the electrolysis process. The $O_2$ electrolysis product may be reinjected back into the fossil fuel electrical power plant.

Alternatively, a second source of non-$CO_2$ emitting electricity, such as renewable or nuclear powered electricity, may be employed to power the electrolysis process, and the $O_2$ electrolysis product may be injected back into the fossil fuel electrical power plant.

Some embodiments of the disclosure thus relate to a method of forming low carbon foot print structural materials. The method includes providing a structural material, providing a reinforcement material comprising a low carbon footprint carbon nanomaterial (CNM) formed with a carbon-footprint of less than 10, and forming a composite comprising the structural material and 0.001 wt % to 25 wt % of the carbon nanomaterial. The carbon nanomaterial is dispersed homogeneously in the composite. In some embodiments, the carbon nanomaterial is formed from a molten carbonate by electrolysis, along with oxygen and dissolved metal oxide, as will be further described below.

In some embodiments, a power plant can provide a $CO_2$ source from the flue stacks that is fed into an electrolyzer. The electrolyzer may contain a molten electrolyte such as lithium carbonate along with a metal cathode that can be copper, stainless steel, or a Monel cathode. As described above, transition metal nucleated electrolysis produces a carbon nanomaterial product, along with oxygen. Compared to conventional methods for producing carbon nanomaterials, the method described above has a significantly lower overall output of greenhouse gases. The carbon nanomaterial can then be combined with a structural material to create a carbon nanomaterial composite.

The hot oxygen product of the electrolysis reaction is useful in a range of processes if recovered. The recovered oxygen can then be used as a feedstock for the manufacture of a range of oxygen containing products. For example, a variety of industrial chemicals and monomers such as $TiO_2$, ethylene and propylene oxides, acetaldehyde, vinyl chloride or acetate and caprolactam can be prepared. Additionally, the hot oxygen source can be used as an alternative to air in combustion, resulting in less fuel consumed or generating a higher combustion temperature.

The carbon nanomaterials are synthesized from electrolysis of $CO_2$ and may include carbon nanotubes, carbon nanofibers, carbon nano-onions, carbon nano-platelets, carbon nano-scaffolds, or graphene. In each case the products may be synthesized to a high coulombic efficiency of over 95% and in some cases the purity may be over 95%.

When carbon nanofibers are used, they may have an aspect ratio of 10 to 1000, and an average thickness of 3 to 999 nm. Untangled CNTs with a high aspect ratio may be readily dispersed in water with sonication to form homogeneous dispersion.

The electrolysis conditions can be controlled to produce CNTS of selected uniform thickness, having twisted or straight longitudinal shape; or to produce thick straight CNTs.

In some embodiments, tangled 5-8 μm long CNTs can be grown on a copper cathode nucleated with Ni powder added to the electrolyte to provide nucleation points for CNT growth. Electrolysis may be performed over different time lengths, such as 15, 30 or 90 minutes, to yield carbon nanofibers with different thickness, such as thin (~20 nm), medium (~47 nm), or thick (~116 nm) walled CNTs. Multi-walled CNTs may exhibit the distinctive graphene layered characteristic 0.335 nm separation between concentric cylindrical walls. By pasting nickel powder directly on the copper cathode prior to electrolysis, straight 5-10 μm long CNTs can be formed at the nickel nucleation points.

In some embodiments, when an extended charge, Monel cathode, and nickel and chromium induced nucleation electrolysis is instead applied, very long CNTs with a length of 200-2000 μm can be produced.

In some embodiments, after 5 hours synthesis using a brass cathode under various controlled conditions, a carbon nanotube product including bunched, straight or thicker CNTs can be produced.

In some embodiments, cement and carbon nanotubes may be co-produced in a plant with a negative carbon footprint ($F_c$<0), for example, as disclosed in Licht, "Co-production of cement and carbon nanotubes with a carbon negative footprint," J. $CO_2$ Utilization, 2017, vol. 18, pp. 378-389.

A process described herein can be scaled to produce large quantities of commercially valuable products and by-products.

Returning to FIG. 1, at S106 the structural material and the carbon nanomaterial are mixed or combined to form a composite.

A wide variety of methods can be utilised to incorporate the above described CNMs into the desired structural material. Having a homogenous dispersion of the CNM within the structural material can provide improved mechanical properties in the resulting composite material.

As used herein, a homogeneous dispersion of the carbon nanomaterial in the composite refers to substantially uniform distribution of the carbon nanomaterial, such as carbon nanofibers, throughout the composite, so that the composite has substantially uniform mechanical properties in different regions of the composite. It is not necessary for the nanomaterial to be dispersed at molecular levels, or at individual fiber levels when nanofibers are dispersed. Limited aggregation or entanglement of the fibers within small domains, such as domains with domain sizes less than about 1,000 μm may be tolerated in some applications. However, larger domains of concentrated carbon nanomaterials unevenly distributed in the composite can cause material defects or weakness, or reduce the efficient utilization of the reinforcement materials.

In some embodiments the structural material is cement. In order to incorporate the CNM into the cement, a dispersion of the CNM in an aqueous liquid such as water can be formed by addition of the CNM to water, followed by mixing using bath sonication to uniformly and evenly disperse the CNM in the liquid mixture. In some embodiments, a surfactant may be added to prevent agglomeration of the CNM. The CNM dispersion may be then added to dry cement powder, along with additional water if required. Mechanical mixing may be used to fully disperse the CNM in the aqueous cement mixture, so the CNM is homogeneously dispersed in the admixture and the resulting composite will contain homogeneously dispersed CNM.

In some embodiments, homogeneous dispersion of the CNM in the admixture may be facilitated by sonication, adding a surfactant, or stirring, or any combination thereof. Conveniently, sonication does not require a significant carbon footprint.

In some embodiments, the above described processes can be used to form concrete, mortar, or grout that contains cement and homogeneously dispersed CNM.

The addition of 0.048 wt % of CNT can increase cement, concrete, mortar or grout tensile strength by 45%. Hence, for a simple (one dimensional applied force) usage case, such as a thinner CNT-cement composite to bear the same load, 1 tonne of CNT can replace 938 tonne of aluminum. Using a CNT-cement composite containing 1 tonne of CNT to replace cement can reduce 844 tonnes of emitted $CO_2$ during cement, or in the same manner, concrete, mortar or grout, production. This process of reducing the $CO_2$ emission in the production of cement through the addition of low cost or low $F_c$ carbon nanotubes is illustrated in FIG. 12(A). The figure shows the massive carbon dioxide avoidance by addition of carbon nanotubes synthesized from $CO_2$ to CNT-composites with CNT-cement. B: Carbon mitigation with CNT-Al. The latter (B) includes a cascade effect due to virgin Al's large carbon footprint triggering larger $CO_2$ emission elimination.

In some embodiments, the structural material may be aluminum. A heating apparatus such as an air induction heater may be used to heat solid aluminum until molten after which a CNM may be added. The strong convective currents ensures the CNM is well dispersed within the molten aluminum which may then subsequently be cast into ingots or processed into a final product. Oxygen may be excluded from this method to prevent oxidation of the CNM due to the high temperatures. Alternatively, a similar composite may ultimately be formed by addition of a CNM to aluminum powder. Mixing of the two materials may be affected by a process such as ball milling, followed by hot extrusion.

The addition of 0.1 wt % of CNT can increase aluminum tensile strength by 37%. Hence, for a simple (one dimensional applied force) usage case, such as a thinner CNT-Al composite foil to bear the same load, 1 tonne of CNT can replace 370 tonne of aluminum. Using a CNT-Al composite containing 1 tonne of CNT to replace virgin aluminum can reduce 4,403 tonnes of emitted $CO_2$ during aluminum production. This process of reducing the $CO_2$ emission in the production of aluminum through the addition of low cost or low FC carbon nanotubes is illustrated in FIG. 12(B). The figure shows the massive carbon dioxide avoidance by addition of carbon nanotubes synthesized from $CO_2$ to CNT-composites with CNT-aluminum and includes a cascade effect due to virgin Al's large carbon footprint triggering larger $CO_2$ emission elimination.

In some embodiments, a low carbon footprint composite may be prepared using magnesium and CNM. It is expected that CNM agglomeration would decrease CNM-metal interaction, thus prevent formation of effective magnesium-CNM composites. This problem may be addressed by coating the CNMs with nickel, to provide an effective $Mg_2Ni$ interface between the CNM and magnesium. By adding 0.3 wt % of Ni-coated CNTs, the CNT-magnesium composite can exhibit an increased tensile strength, such as by 39% as compared to pure magnesium. Replacing magnesium with a CNT-Mg composite of equivalent strength can reduce $CO_2$ emission by 1,820 tonnes per tonne of CNT.

Production of a low carbon footprint composite using metals with higher melting points such as titanium, copper and steel can be more challenging due to difficulties in achieving uniform dispersion of the CNM. When the metal used is titanium, a premix of elemental titanium powders can be formed, and then subjected to spark plasma sintering.

In some embodiments the metal for forming the composite may be copper. A suspension of CNM in a solvent may be formed, and copper powder may be added to the CNM suspension to form a mixture. The mixture may be subjected to calcination and reduction to produce copper-CNT composite powder, which has CNMs homogeneously dispersed within the powder. In some embodiments, the mixture may be sintered, such as by spark plasma sintering or microwave sintering, to form the composite material.

With homogeneous dispersion of 1 wt % CNTs into copper in the resulting CNT-Cu composite, a 207% strength increase in the CNT-Cu composite has been observed. Such a composite can proportionally replace 67 tonnes of copper by 1 tonne of CNT, and still provide the same mechanical strength to copper. The carbon footprint of copper production varies widely by region, but globally has a combined average of approximately 5 tonne $CO_2$ per tonne Cu. By replacing copper production with the production of equivalent CNT-Cu composite, emission of $CO_2$ during production can be substantially reduced. For example, emission of 337 tonnes of $CO_2$ can be avoided if 67 tonnes of copper is replaced with one tonne of CNT and each tonne of copper production emits 5 tonnes of $CO_2$.

In some embodiments, the structural material may be stainless steel. CNM may be added in solid form to the steel powder and the resulting mixture is placed in a ball mill to grind and blend the ingredients together (by ball milling), followed by spark plasma sintering to form the composite material. The massive global annual production of stainless steel coupled with a high carbon footprint, $F_c$=6.15, which includes 5.3 tonnes of $CO_2$ emission for generating the energy required to produce one tonne of steel.

A CNT-stainless steel composite containing 0.75 wt % CNT can exhibit 37% higher strength. Thus, it is expected that using CNT-stainless steel composite to replace stainless steel can reduce $CO_2$ emission by 302 tonnes $CO_2$ per tonne of CNT.

The net energy required by the transformation of $CO_2$ to CNTs is 2.0 MWh per tonne $CO_2$ reacted to CNT (1.6 MWh at 0.8V).

The reduction in $CO_2$ emission associated with using different composites of CNM with cement, aluminum, magnesium, titanium, or stainless steel, and the corresponding improvement in mechanical strength are summarized in Table I.

In Table I, the last column lists the net energy consumed by transformation of $CO_2$ to CNTs by electrolysis in molten carbonate.

TABLE I

|  | wt % CNT | Strength | Change in Strength | Reduction in structural material (ton) | $F_c$ | Reduction in $CO_2$ emission (ton) | Energy required per tonne $CO_2$ (kWh) |
| --- | --- | --- | --- | --- | --- | --- | --- |
| cement | 0.048% | tensile | 45% | 938 | 0.9 | 840 | 2.45 |
| aluminum | 0.10% | tensile | 37% | 370 | 11.9 | 4400 | 0.47 |
| magnesium | 0.30% | tensile | 39% | 130 | 14 | 1820 | 1.14 |
| titanium | 0.3% | yield | 102% | 339 | 8.1 | 2750 | 0.75 |
| stainless steel | 0.75% | tensile | 37% | 49 | 6.15 | 302 | 6.85 |
| copper | 1.0% | tensile | 207% | 207 | 5 | 337 | 1.14 |

In some embodiments, the structural material may a polymer, such as a polymer plastic. A CNM may be added to a molten plastic, followed by mechanical mixing to disperse the CNM. The composite may then be formed into a final product via a process such as injection molding, blow molding or extrusion.

In some embodiments, the structural material may be a wood material. In an example, CNMs may be added in solid form during the production of medium density fibreboard (MDF). Addition of solid CNMs to wood fibres prior to addition of a urea-formaldehyde resin, followed by pressing into sheets yields a composite material.

In some embodiments, the structural material may be a cardboard. Solid CNMs may be added to a slurry of wood pulp fibres formed from pine chips. This slurry can then be pumped into a paper making machine to form kraft paper. The kraft paper is corrugated into the CNM cardboard composite material.

Figure 9:
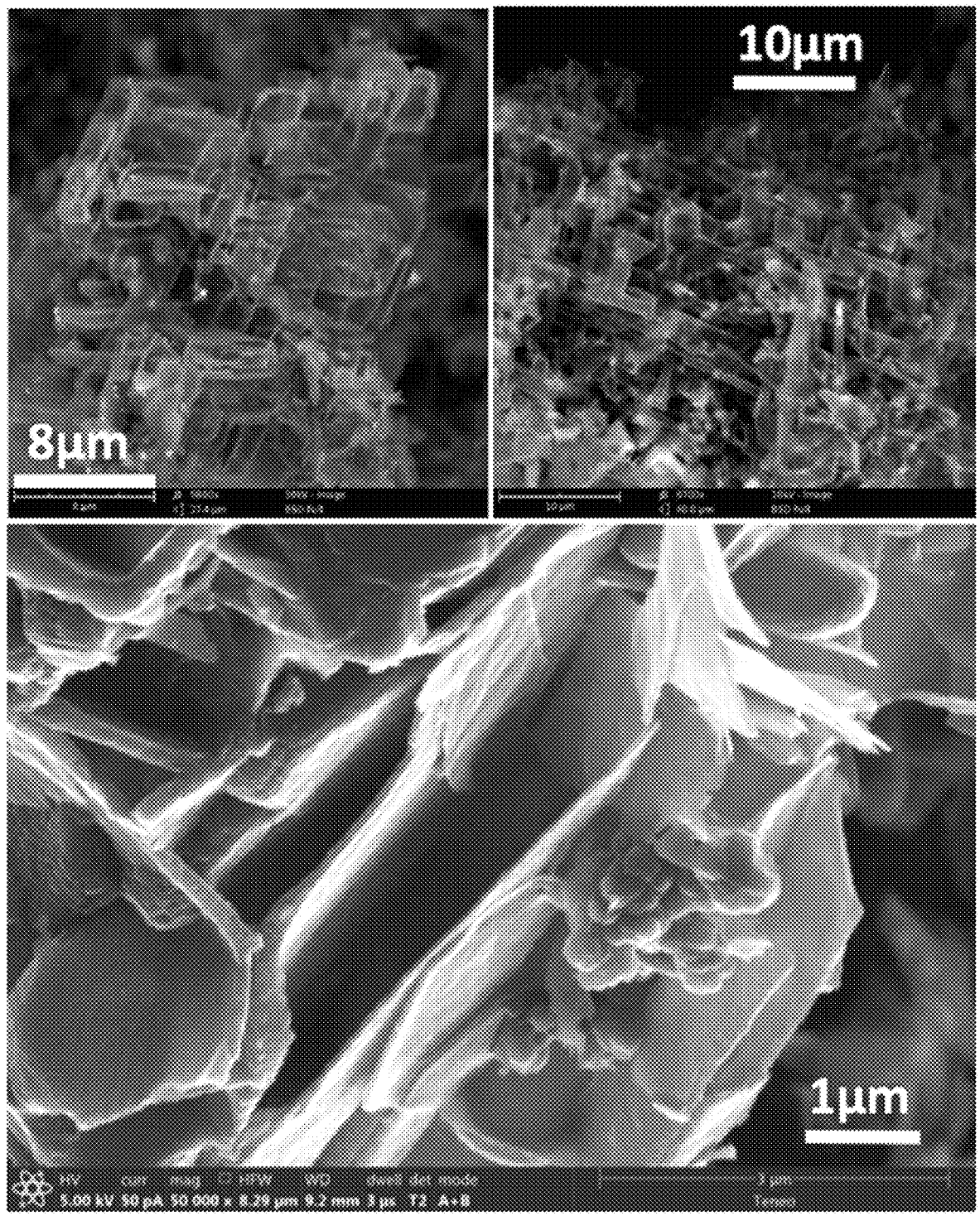
FIG. 9 shows a sample carbon nano-scaffolds.

In some embodiments, the structural material may be a laminate or drywall. During the production of a gypsum plaster layer, CNMs may be added to a mixture of gypsum plaster, fibre, plasticizer, foaming agent and chelator that is sandwiched between two sheets of heavy paper or fibre glass. The CNMs may be added to the wet mixture either in solid form or as a suspension in a solvent such as water to provide additional strength to the drywall. A laminate is formed from layers to form a flat material. The laminate layers may be formed from CNM-composite with resin, plastic, wood fibres, papers or simply hard layers of CNM containing electrolyte as illustrated in FIG. 9. The exhibits the ease at which as-grown films that are removed by simple peeling from the cathode. The film is grown by an 18 hour electrolysis at 0.1 A cm$^{-2}$ in 770° C. molten $Li_2CO_3$ on an 12.5 cm×20 cm electrode. The Inconel anode and 304 steel electrolysis case are not affected by repeat electrolysis. The film thickness is directly proportional to the electrolysis time allowing films in this objective of 0.0004" (or less) to be studied. The film is a mirror reflection of the cathode surface. In this case, the gold colored Muntz Brass is used to highlight that the cathode material is not transferred to the grown film, that the cathode is ready for re-use (subsequent to film peel), and that the removed film mirrors the slightly deformed cathode surface. Muntz Brass has the lowest melting point, 899° C., of the cathodes studied. The deformation which occurs during electrolysis at 770° C. is controlled by a steel brace on the electrode side hidden from the anode, and the minor deformation exaggerates that the flatness of the peeled film mirrors the cathode surface.

In some embodiments the CNM may be added in solid form to the cement powder and the resulting mixture is placed in a ball mill to grind and blend the ingredients together prior to addition of water.

It should be noted that homogeneous dispersion of CNM in the composite can provide a stronger composite. Thus, measures will need to be taken to avoid non-homogeneous distribution, such as local concentration, of the CNM in the composite. For example, tangled CNTs tend to agglomerate and are not readily miscible in aqueous mixtures. Thus, untangled CNTs produced from molten carbonate by electrolysis are particularly suitable in an embodiment of the present disclosure. In the production of the CNTs, the electrolysis conditions should be controlled and can be modified to provide precise control over the carbon nanotube product morphology.

In different embodiments, a CNM product can be formed in either pure Li2CO3 or mixed binary or ternary lithiated, or lithium-free molten carbonates at 750° C.

It is noted that mixtures of alkai (lithium, sodium, or potassium) carbonates are less viscous than a pure molten carbonate salt.

Anodic corrosion during electrolysis may be avoided ore reduced by exclusion of potassium carbonate from the electrolyte.

It has been shown that addition of merely 0.048 wt % (C) CNT to cement can form a composite having increased tensile strength (S), such as by 45%, as compared to the tensile strength of pure cement. Therefore, in some cases, a thinner layer of the composite comprising cement and CNT can provide the same strength as a thicker layer of pure cement. As a result, cement usage may be reduced. In other cases, CNT may be used as a reinforcement material in concrete to replace other reinforcement materials that have high carbon footprints, such as steel. In such cases, while cement usage may not be reduced, the overall carbon footprint of the concrete is still reduced.

In a simple usage case, such as a thinner floor to bear the same load, a 1/1.45 as thick, but 45% stronger, CNT-cement composite can have the same strength as cement without CNT. That is, a composite of 1 tonne-CNT (0.048 wt %) in 2082 tonnes of cement has the same strength as 3021 tonne of cement. Thus, using a CNT-cement composite containing one tonne CNT can reduce the needed cement by 938 tonne. As a result, a much smaller carbon footprint is required by replacing pure cement with the CNT-cement composite.

It can now be appreciated that a carbon nanomaterial produced with a carbon-footprint of less than 10 unit weight of carbon dioxide ($CO_2$) emission during production of 1 unit weight of the carbon nanomaterial may be used for reinforcing a structural material. In some embodiments, the carbon nanomaterial may be produced from a molten carbonate by electrolysis. The composite may be a composite disclosed herein.

In some embodiments, a carbon nanomaterial may be used in a composite comprising a structural material to reinforce the structural material, wherein the carbon nanomaterial is produced with a carbon-footprint of less than 10 unit weight of carbon dioxide ($CO_2$) emission during production of 1 unit weight of the carbon nanomaterial. In some embodiments, the carbon nanomaterial may be produced from a molten carbonate by electrolysis. The composite may be a composite disclosed herein.

In some embodiments, a carbon nanomaterial produced with a low carbon-footprint is used in a composite comprising a structural material and the carbon nanomaterial, for reducing overall emission of carbon dioxide ($CO_2$) during the manufacture of the composite, wherein the low carbon-footprint is a carbon-footprint of less than 10 unit weight of $CO_2$ emission during production of 1 unit weight of the carbon nanomaterial. In some embodiments, the carbon nanomaterial may be produced from a molten carbonate by electrolysis. The composite may be a composite disclosed herein.

Assuming "W" represents the weight of a composite of the structural material and CNM, "N" represents the pure structural material without added CNM, "C" represents the CNT weight concentration in the composite, and "S" represents the strength increase in percentage, the weight of the composite containing 1 unit weight of CNT is:

$$W=100\%/C \quad (4)$$

N can be determined by, $$N=W\times(100\%+S)/100\%, \quad (5)$$

The weight reduction of the structural material in the composite from the pure structural material (N−W) is $$N-W=W(100\%+S)/100\%-W=W\times(S/100\%) \quad (6)$$

EXAMPLES

Example I

It was demonstrated by testing that untangled CNTs with a high aspect ratio were readily dispersed in water by sonication without the use of a surfactant. The water dispersed CNTs were admixed with Portland cement to form a CNT-cement composite. See FIGS. 3A, 3B and 3C.

In this example, the sample CNTs shown in FIG. 3A were formed by electrolysis in a low viscosity binary lithium-sodium carbonate electrolyte. Untangled CNTs were synthesized at 740° C. in the molten electrolyte containing 73 wt % $Li_2CO_3$, 17 wt % $Na_2CO_3$, and 10 wt % $LiBO_2$ by electrolysis using a brass cathode and an Inconel cathode, with a system as illustrated in FIG. 2. It was also observed that adding a metaborate salt to the electrolyte improved the aspect ratio of the CNTs.

The scanning electron microscope (SEM) image of the CNT product shown in FIG. 3A contained about 90 wt % CNTs. The electrolysis process occurred at 97.5% coulombic efficiency, determined with equation (3) comparing the moles of CNT product to the integrated electrolysis current.

The CNTs were dispersed in water and the resulting aqueous mixture was sonicated. As can be seen in FIG. 3B, sonication caused homogeneous dispersion of the CNTs in water. It was also observed that, without sonication, CNTs agglomerated in water and the CNTs were not homogeneously dispersed in water.

Upon mixing the aqueous suspension of homogeneously dispersed CNTs with Portland cement, the resulting admixture was readily cast into CNT-cement composites, as shown in FIG. 3C. Less than 0.8 wt %, such as 0.048 wt %, of the produced CNTs was added to Portland cement to form the CNT-cement composite.

It was observed that less than 0.75 unit weight of the composite could provide the same mechanical strength as 1 unit weight of the pure cement, a reduction in mass by at least 25%.

Example II

In this example, sample materials were produced with the following objectives to provide strong CNT-cement composites: (i) unbundling the carbon nanotubes produced to allow an even and homogeneous dispersion of the CNTs throughout the cement and (ii) producing longer CNTs to bridge cement grains in the composite.

A CNT synthesis technique referred to as C2CNT technique was used to produce the CNTs. The C2CNT technique involved electrolytic carbonate $CO_2$ splitting technology and was shown to provide CNT morphology control, and could produce long, uniform, untangled CNTs to avoid the bundling of CNTs during mixing with water and cement, and allowed convenient dispersion of the CNTs in a water mixture.

Oxygen was excluded during the addition of the CNMs to the structural material to avoid any oxidation of the CNMs being added.

Example II(1)

CNM-cement composites were made by facile dispersion of CNMs in water, by sonication or by surfactant addition, and then addition to cement powder, with or without aggregates to form CNM-cement composites and CNM-concrete composites.

Example II(2)

CNM-aluminum composites were made by adding CNMs to melted aluminum (Melting point 660° C.). The CNMs were readily dispersed in the melted aluminum. Inductive heating was used to melt the aluminum.

Example II(3)

CNTs made by the C2CNT technique were found to have a negative carbon footprint of at least 800 tonnes $CO_2$ avoided per tonne of CNT produced (see Table I).

It was observed that including 0.048 wt % CNT produced by the C2CNT technique in the CNT-cement composite resulted in an increase in tensile (Young's modulus) strength by 60.8% (after curing for 26 days) and an increase in compressive strength by 80.4% (after curing for 20 days), as compared to the pure cement without the CNTs.

These strength increases were higher than those listed in Table I and higher than the strength increases reported in the literature known to the inventors. The increased strength was expected to be due to the higher uniformity and less bundled nature of the carbon nanotubes prepared by the C2CNT technique.

Without being limited to any particular theory, it was expected that to form stronger CNM-cement composites, not only the CNM's own strengths should be high, so as to provide tensile, compressive and flexural strength enhancements, but also the added CNM should be able to bridge grains of the cement. These bridges were expected to provide a matrix that propagates the strength throughout the bulk composite.

It was observed that the C2CNT technique could control the uniform length and diameter of the produced CNTs. CNTs with uniform thickness and lengths were produced with the C2CNT technique, which included CNTs having a diameter of 200 nm and a length of 80 μm. These CNTs were used to form sample CNT-cement composites, which exhibited the above noted improved strength.

To form the composites, the CNTs were dispersed in water and ultra-sonicated prior to mixing with Portland cement powder. Before sonication, the majority of the CNTs sank to the bottom of the mixing vessel, while some floated on the top of the water. Subsequent to 90 minutes of sonication an evenly colored brown/black solution was obtained (see representative photo shown in FIG. 3B). The CNTs evenly dispersed in water were mixed with Portland cement powder. The admixture was set in various shaped casts and cured prior to testing.

Cylinder and figure "8" casts were used for the compression and tensile strength tests. Representative test strength results are presented in Table I.

Example III

The C2CNT technology was also modified and used to produce other carbon nanomaterials, including graphene, nano-onions, nano-platelets, nano-scaffolds and helical carbon nanotubes. It was observed that each of these CNMs exhibited unusual and valuable physical chemical properties such as lubrication (nano-onions), batteries (graphene) and environmental sorbents (nano carbon aerogels) prior to addition to structure materials, and special properties including improved electrical conductivity and sensing ability for CNM-structural material composites.

It is expected that these materials could provide improved structural materials.

In each case the product was synthesized to a high coloumbic efficiency of over 95%, and in most cases the product had a purity over 95%.

It was observed that a key measurable characteristic correlated to strength was a low defect ratio as measured by the ratio of the ordered (G peak, reflecting the cylindrical planar $sp^2$ bonding amongst carbons) as compared to disorder (D peak, reflecting the out of plane $sp^a$ tetrahedral bonding amongst carbons) in the Raman spectra. Sample multi-walled carbon nanotubes produced by the C2CNT technique exhibited a high (strength) G:D ratio in the Raman spectra as shown in FIG. 6.

Figure 6:
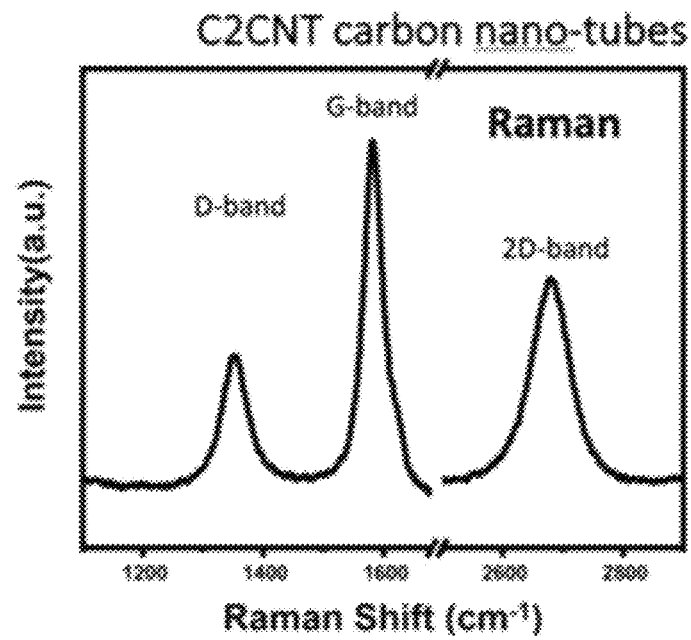
FIG. 6 shows a Raman spectra of sample carbon nanotubes.
Figure 7:
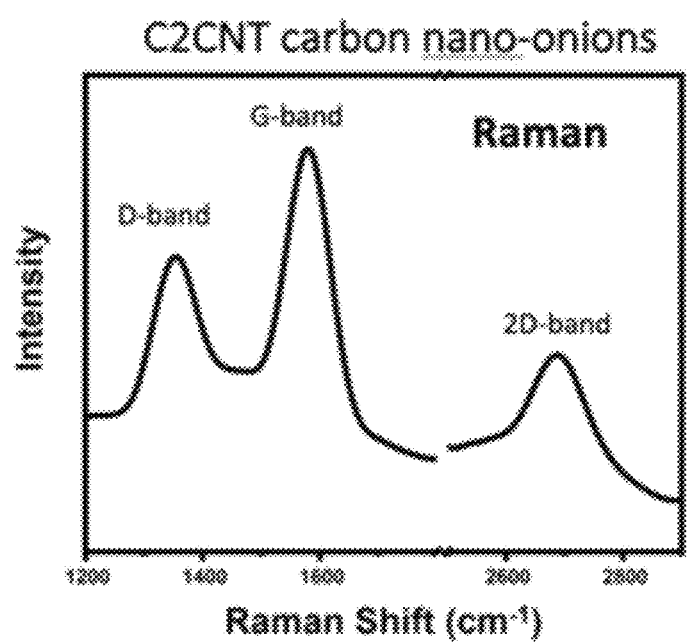
FIG. 7 shows a Raman spectra of sample carbon nanoonions.
Figure 8:
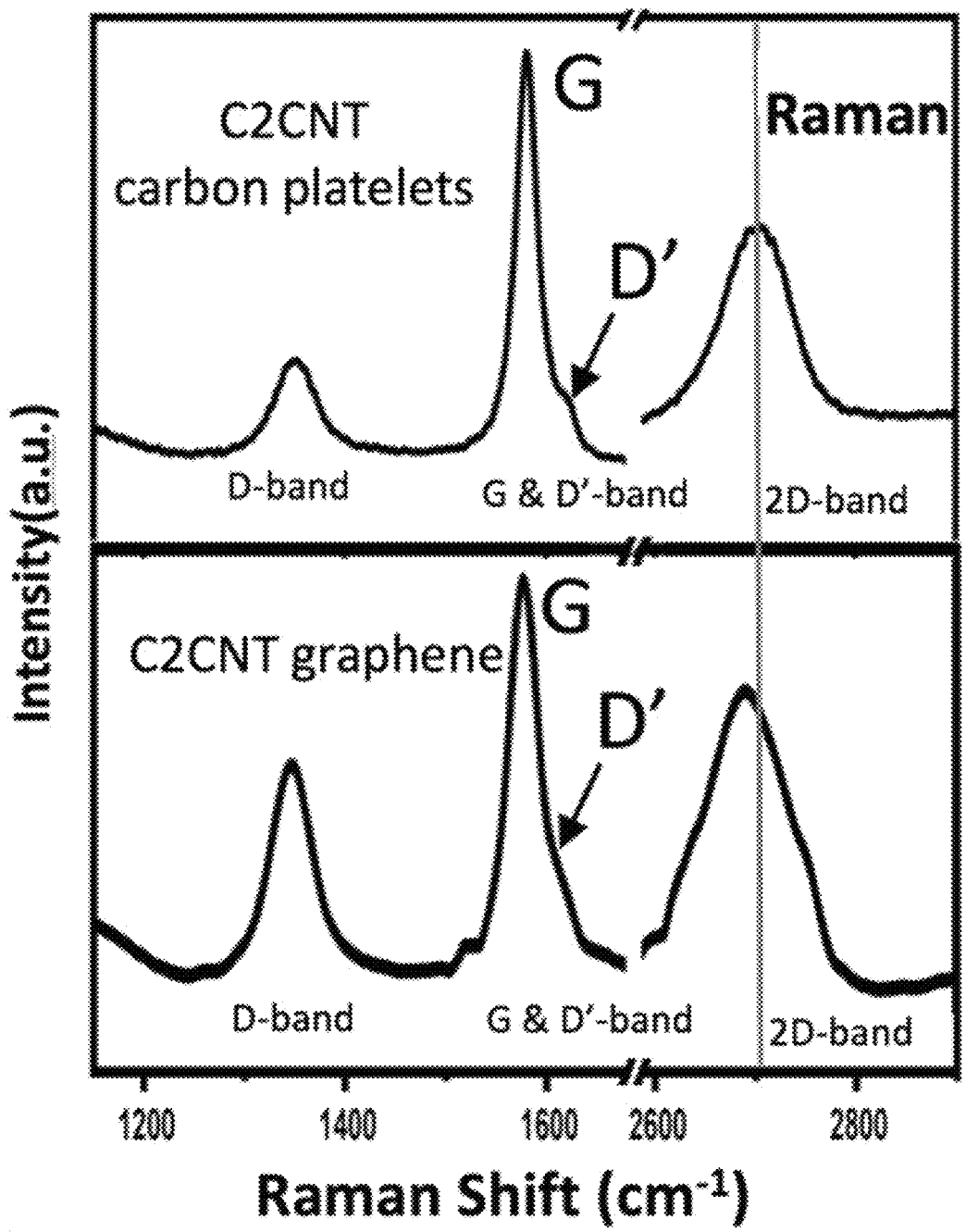
FIG. 8 shows Raman spectra samples of graphene and carbon platelets.

Similar Raman spectra of sample carbon nano-onions produced the C2CNT technique is shown in FIG. 6. Raman spectra of sample carbon nano-platelets produced the C2CNT technique is shown in FIG. 8 top and of sample graphene produced the C2CNT technique in FIG. 8 bottom. The presence of the D'-band is indicative of the layered single and multiple (platelet) graphene layers, and the left shift of the 2-D band indicates the thin graphene layer.

FIG. 9 presents SEM of carbon nano-scaffolds, which are grown at 670° C. in a 50% $Na_2CO_3$ and 50% $Li_2CO_3$ electrolyte at a current density of 0.1 A $cm^{-2}$ with a brass cathode and an Inconel anode. Electrolyses include an additional 10 wt % $H_3BO_3$ which promotes uniform morphology. $H_3BO_3$, rather than $Li_2BO$, was added as a cost saving measure. $H_3BO_3$ upon heating releases water, and contributes the same boron oxide valence state to the electrolyte melt as $Li_2BO$.

Figure 10:
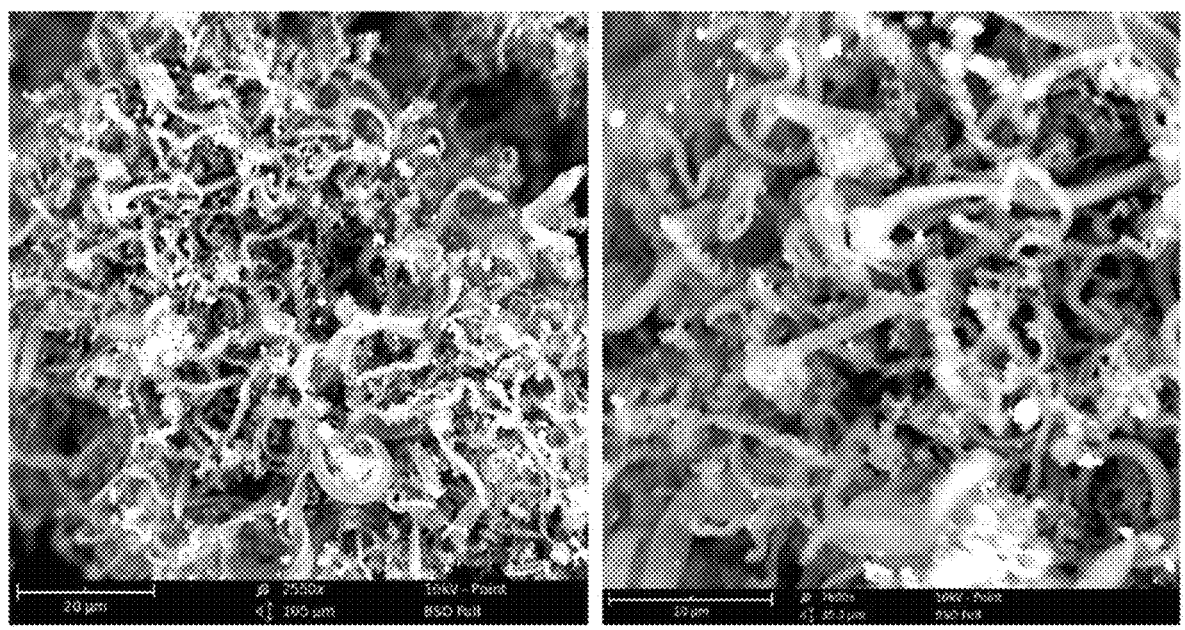
FIG. 10 shows a sample helical carbon nanotubes.
Figure 11:
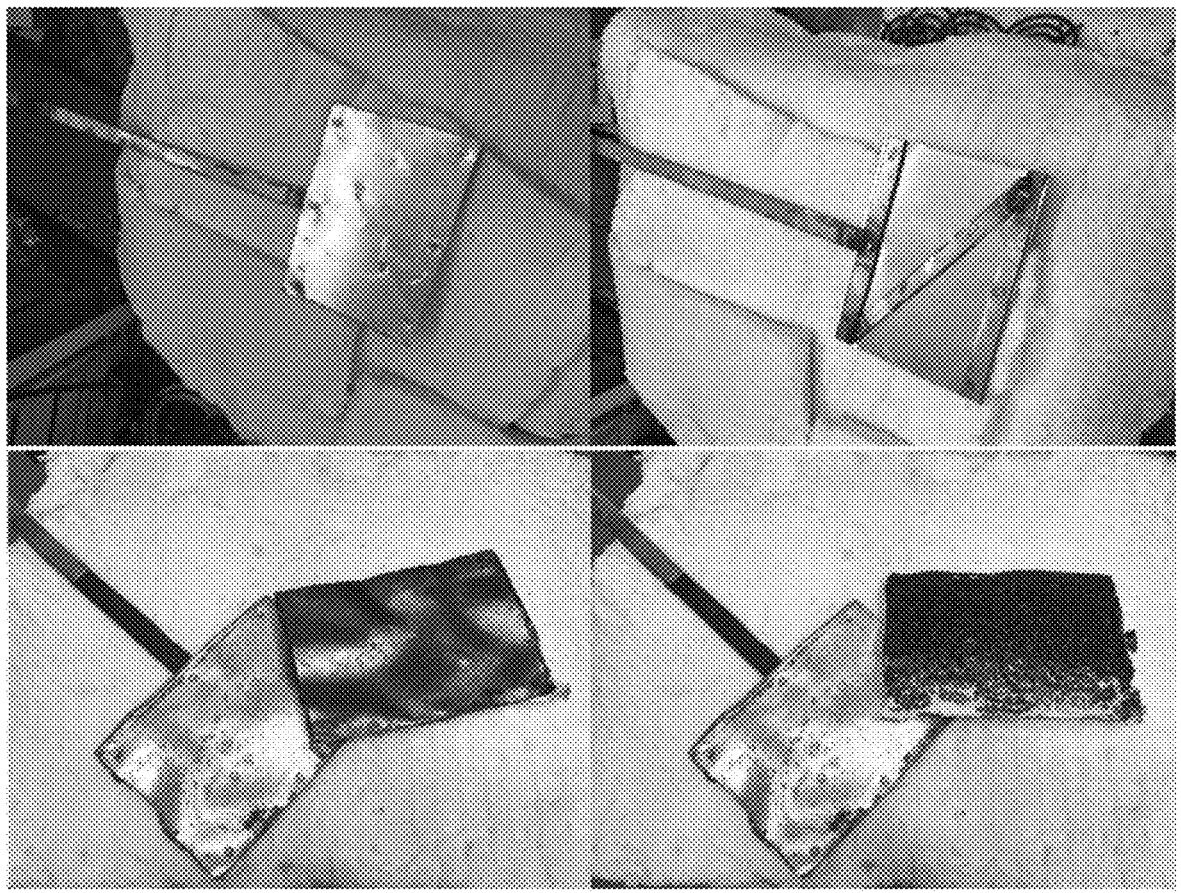
FIG. 11 shows a sample of a laminate carbon nanomaterial component.

FIG. 10 presents SEM of helical carbon nanotubes after washing of the product, which are grown at 750° C. in a 100% $Li_2CO_3$ electrolyte at a high current density (0.5 A $cm^{-2}$) for 2 hours on a brass/Monel cathodes using a Chromel C (Nichrome) anode.

The composites studied in these examples included CNT-aluminum, CNT-steel, CNT-magnesium, CNT-titanium, and CNT-cement.

Concluding Remarks

It will be understood that any range of values herein is intended to specifically include any intermediate value or sub-range within the given range, and all such intermediate values and sub-ranges are individually and specifically disclosed.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method of forming composite materials, comprising steps of:
   providing a high carbon footprint substance;
   providing a carbon nanomaterial produced with a negative carbon-footprint indicating a net consumption of carbon dioxide during the production of the carbon nanomaterial; and
   forming a composite comprising the high carbon footprint substance and from 0.001 wt % to 25 wt % of the carbon nanomaterial, wherein the carbon nanomaterial is dispersed in the composite material to reduce the carbon dioxide emission for producing the composite material relative to the high carbon footprint substance and for increasing a mechanical strength property of the composite material.

2. The method of claim 1, wherein the carbon nanomaterial comprises carbon nanofibers with an average aspect ratio of 10 to 1000 and a thickness of 3 nm to 999 nm.

3. The method of claim 2, wherein the nanofibers comprise one or more of carbon nanotubes, helical carbon nanotubes, untangled carbon nanofibers, carbon nano-onions, a carbon nano-scaffold, a nano-platelet, and graphene.

4. The method of claim 1, wherein the step of forming comprises adding the carbon nanomaterial to a solid phase or a liquid phase or a gas phase of the high carbon footprint substance.

5. The method of claim 1, wherein the step of forming comprises dispersing the carbon nanomaterial in a liquid to form a first mixture, admixing the first mixture with the high carbon footprint substance to form a second mixture, and forming the composite material from the second mixture.

6. The method of claim 1, wherein the carbon nanomaterial is formed from a molten carbonate by electrolysis.

7. The method of claim 6, wherein the molten carbonate is generated by a reaction of carbon dioxide and a metal oxide in a molten electrolyte.

8. The method of claim 7, wherein the metal oxide is lithium oxide.

9. The method of claim 6, wherein the molten carbonate comprises a lithium carbonate or a lithiated carbonate.

10. The method of claim 1, wherein the high carbon footprint substance comprises one or more of cement, concrete, mortar, and grout.

11. The method of claim 1, wherein the high carbon footprint substance comprises a metal.

12. The method of claim 1, wherein the high carbon footprint substance comprises a plastic material, a resin, a ceramic, a glass, an insulator, an electrical conductor, a polymer, wood, a laminate, a cardboard, and a drywall.

* * * * *